(12) United States Patent
Khan et al.

(10) Patent No.: US 10,446,137 B2
(45) Date of Patent: Oct. 15, 2019

(54) AMBIGUITY RESOLVING CONVERSATIONAL UNDERSTANDING SYSTEM

(71) Applicant: Microsoft Technology Licensing, LLC., Redmond, WA (US)

(72) Inventors: Omar Zia Khan, Bellevue, WA (US); Ruhi Sarikaya, Redmond, WA (US); Divya Jetley, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/297,790

(22) Filed: Oct. 19, 2016

(65) Prior Publication Data
US 2018/0068657 A1   Mar. 8, 2018

Related U.S. Application Data

(60) Provisional application No. 62/384,500, filed on Sep. 7, 2016.

(51) Int. Cl.
*G10L 15/00* (2013.01)
*G10L 15/06* (2013.01)
(Continued)

(52) U.S. Cl.
CPC .......... *G10L 15/1815* (2013.01); *G06F 9/451* (2018.02); *G06F 17/2785* (2013.01);
(Continued)

(58) Field of Classification Search
CPC ......... G06F 2203/0381; G06F 11/0793; G06F 17/30424; G06F 19/00; G06F 17/3053;
(Continued)

(56) References Cited

U.S. PATENT DOCUMENTS 6,182,028 B1   1/2001 Karaali et al.
6,581,033 B1   6/2003 Reynar et al.
(Continued)

FOREIGN PATENT DOCUMENTS

CN    1959628 A     5/2007
CN   101038581 A    9/2007
(Continued)

OTHER PUBLICATIONS

"Final Office Action Issued in U.S. Appl. No. 14/591,603", dated Jun. 8, 2018, 31 Pages.
(Continued)

*Primary Examiner* — Michael Ortiz-Sanchez

(57) ABSTRACT

Systems, components, devices, and methods for resolving ambiguity in a conversational understanding system are provided. A non-limiting example is a system or method for resolving ambiguity in a conversational understanding system. The method includes the steps of receiving a natural language input and identifying an agent action based on the natural language input. The method also includes the steps of determining an ambiguity value associated with the agent action and evaluating the ambiguity value against an ambiguity condition. The method includes the steps of when determined that the ambiguity value meets the ambiguity condition: selecting a prompting action based on the ambiguity associated with the identified agent action, performing the prompting action, receiving additional input in response to the prompting action, and updating the agent action to resolve the ambiguity based on the additional input. The method also includes the step of performing the agent action.

20 Claims, 19 Drawing Sheets

(51) Int. Cl.
*G10L 15/18* (2013.01)
*G10L 15/22* (2006.01)
*G06F 17/27* (2006.01)
*G06F 9/451* (2018.01)
*G06F 16/332* (2019.01)

(52) U.S. Cl.
CPC ............ *G10L 15/063* (2013.01); *G10L 15/22* (2013.01); *G06F 16/3326* (2019.01); *G10L 2015/0635* (2013.01); *G10L 2015/221* (2013.01); *G10L 2015/223* (2013.01)

(58) Field of Classification Search
CPC ............... G06F 19/3468; G06F 21/577; G06F 11/3457; G06F 17/2785; G06F 17/30648; G06F 17/30867; G06F 17/30979; G06F 9/451; G10L 15/26; G10L 15/22; G10L 2015/223; G10L 15/01; G10L 15/065; G10L 15/183; G10L 15/20; G10L 25/00; G10L 25/51; G10L 15/063; G10L 15/1815; G10L 2015/0635; G10L 2015/221; H04L 63/1433
See application file for complete search history.

(56) References Cited

U.S. PATENT DOCUMENTS

| | | | |
|---|---|---|---|
| 6,922,669 | B2 | 7/2005 | Schalk et al. |
| 6,931,384 | B1 | 8/2005 | Horvitz et al. |
| 7,149,970 | B1 | 12/2006 | Pratley et al. |
| 7,216,080 | B2 | 5/2007 | Tsiao et al. |
| 7,493,257 | B2 | 2/2009 | Kim et al. |
| 7,577,709 | B1 | 8/2009 | Kolcz |
| 7,606,714 | B2 | 10/2009 | Williams et al. |
| 7,684,990 | B2 | 3/2010 | Caskey et al. |
| 7,716,056 | B2 | 5/2010 | Weng et al. |
| 7,729,904 | B2 | 6/2010 | Bennett |
| 7,869,998 | B1 | 1/2011 | Di Fabbrizio et al. |
| 7,925,507 | B2 | 4/2011 | Weng et al. |
| 7,974,842 | B2 | 7/2011 | Helbing et al. |
| 8,249,876 | B1 | 8/2012 | Ainslie |
| 8,346,563 | B1 | 1/2013 | Hjelm et al. |
| 8,355,920 | B2 | 1/2013 | Gopinath et al. |
| 8,566,076 | B2 | 10/2013 | Deng et al. |
| 8,600,760 | B2 | 12/2013 | Grost et al. |
| 8,677,377 | B2 | 3/2014 | Cheyer et al. |
| 8,799,000 | B2 | 8/2014 | Guzzoni et al. |
| 8,909,528 | B2 | 12/2014 | Eide et al. |
| 8,954,420 | B1 | 2/2015 | Khan et al. |
| 8,983,840 | B2 | 3/2015 | Deshmukh et al. |
| 8,996,381 | B2 | 3/2015 | Mozer et al. |
| 9,009,046 | B1 | 4/2015 | Stewart |
| 9,043,197 | B1 | 5/2015 | Pasca et al. |
| 9,152,376 | B2* | 10/2015 | Johnston ................. G06F 3/167 |
| 9,311,298 | B2 | 4/2016 | Sarikaya et al. |
| 9,318,108 | B2 | 4/2016 | Gruber et al. |
| 9,548,050 | B2 | 1/2017 | Gruber et al. |
| 9,576,578 | B1 | 2/2017 | Skobeltsyn et al. |
| 9,690,851 | B2 | 6/2017 | Nauze et al. |
| 9,886,950 | B2 | 2/2018 | Karov et al. |
| 10,140,206 | B2* | 11/2018 | Sapozhnikov ...... G06F 11/3672 |
| 2002/0077806 | A1* | 6/2002 | Tarbouriech .......... G06F 17/271 704/4 |
| 2003/0187644 | A1 | 10/2003 | Mohri et al. |
| 2003/0233230 | A1 | 12/2003 | Ammicht et al. |
| 2005/0149498 | A1 | 7/2005 | Lawrence et al. |
| 2006/0271364 | A1 | 11/2006 | Mirkovic et al. |
| 2007/0038436 | A1 | 2/2007 | Cristo et al. |
| 2008/0177541 | A1 | 7/2008 | Satomura |
| 2010/0100380 | A1 | 4/2010 | Tur |
| 2012/0089387 | A1 | 4/2012 | Gamon et al. |
| 2012/0089392 | A1 | 4/2012 | Larco et al. |
| 2012/0102050 | A1 | 4/2012 | Button et al. |
| 2012/0173464 | A1 | 7/2012 | Tur et al. |
| 2012/0265528 | A1 | 10/2012 | Gruber et al. |
| 2012/0296638 | A1 | 11/2012 | Patwa |
| 2013/0080171 | A1 | 3/2013 | Mozer et al. |
| 2013/0275164 | A1 | 10/2013 | Gruber et al. |
| 2013/0332158 | A1 | 12/2013 | Corfield et al. |
| 2014/0019116 | A1 | 1/2014 | Lundberg et al. |
| 2014/0040274 | A1* | 2/2014 | Aravamudan .... G06F 17/30386 707/741 |
| 2014/0040748 | A1 | 2/2014 | Lemay et al. |
| 2014/0181096 | A1 | 6/2014 | Zhuang et al. |
| 2014/0250378 | A1 | 9/2014 | Stifelman et al. |
| 2014/0280092 | A1 | 9/2014 | Marantz et al. |
| 2014/0379326 | A1 | 12/2014 | Sarikaya et al. |
| 2015/0012271 | A1 | 1/2015 | Peng et al. |
| 2015/0142420 | A1 | 5/2015 | Sarikaya et al. |
| 2015/0340033 | A1 | 11/2015 | Di Fabbrizio et al. |
| 2016/0196499 | A1 | 7/2016 | Khan et al. |
| 2016/0378080 | A1* | 12/2016 | Uppala ................... G10L 15/22 700/275 |
| 2017/0139816 | A1* | 5/2017 | Sapozhnikov ............ G06F 8/00 |
| 2017/0330560 | A1* | 11/2017 | Wang ..................... G10L 15/183 |
| 2018/0321052 | A1* | 11/2018 | Gilbert .................... H04W 4/70 |

FOREIGN PATENT DOCUMENTS

| | | |
|---|---|---|
| EP | 1199630 | 4/2002 |
| JP | 2003255986 | 9/2003 |
| WO | 200075864 | 12/2000 |
| WO | 2006084228 | 8/2006 |
| WO | 2008049834 | 5/2008 |
| WO | 2011028842 A2 | 3/2011 |
| WO | 2011088053 | 7/2011 |
| WO | 2012135783 | 10/2012 |

OTHER PUBLICATIONS

"Final Office Action Issued in U.S. Appl. No. 14/797,492", dated May 16, 2018, 10 Pages.

Brezillon, Patrick, "Context-Based Intelligent Assistant Systems: A discussion based on the Analysis of Two Projects", In Proceedings of the 36th Annual Hawaii International Conference on System Sciences, Jan. 6, 2003, 9 pages.

Chen et al., "Machine Learning", Published on: Mar. 4, 2010, Available at: http://research.microsoft.com/en-us/groups/ml/, 3 pgs.

Crockett, et al., "A Fuzzy Model for Predicting Learning Styles using Behavioral Cues in an Conversational Intelligent Tutoring System", In IEEE International Conference on in Fuzzy Systems, Jul. 2013, 8 pages.

He, et al., "Speech-Centric Information Processing: An Optimization-Oriented Approach", In Proceedings of IEEE, vol. 101, Issue 5, May 2013, 20 pages.

Kang, et al., "Hierarchical Speech-Act Classification for Discourse Analysis", In Journal of Pattern Recognition Letters, vol. 34, Issue 10, Jul. 2013, 21 pages.

Khan, Omar Zia, et al., "Hypotheses Ranking and State Tracking for a Multi-Domain Dialog System using Multiple ASR Alternates", Sep. 1, 2015, retrieved from Internet https://www.microsoft.com/en-us/research/wp-content/uploads/2015/09/1593anav.pdf, 5 pages.

PCT 2nd Written Opinion in International Application PCT/US2016/012247, dated Nov. 23, 2016, 8 pgs.

PCT 2nd Written Opinion Issued in PCT Application No. PCT/US2016/041827, dated Jun. 13, 2017, 6 Pages.

PCT International Application PCT/US2016/012247, International Preliminary Report on Patentability dated Feb. 22, 2017, 9 pages.

PCT International Preliminary Report on Patentability Issued in PCT Patent Application PCT/US2016/041827, dated Sep. 29, 2017, 9 Pages.

PCT International Search Report and Written Opinion Issued in PCT Application No. PCT/US2017/048106, dated Nov. 24, 2017, 12 Pages.

PCT International Search Report in International Application PCT/US2016/012247, dated Apr. 14, 2016, 13 pages.

PCT International Search Report in International Application PCT/US2016/041827, dated Sep. 30, 2016, 13 pages.

(56) References Cited

OTHER PUBLICATIONS

Robichaud, et al., "Hypotheses Ranking for Robust Domain Classification and Tracking in Dialogue Systems", Proc. Interspeech, Sep. 14, 2014, retrieved from Internet: http://mazsola.iit.uni-miskolc.hu/-czap/letoltes/IS14/IS2014/pdf/author/is141384.pdf, 5 pages.
U.S. Appl. No. 14/591,603, Amendment and Response filed Jan. 8, 2018, 28 pages.
U.S. Appl. No. 14/591,603, Office Action dated Jul. 6, 2017, 32 pages.
U.S. Appl. No. 14/797,492, Amendment and Response filed Apr. 27, 2017, 19 pages.
U.S. Appl. No. 14/797,492, Amendment and Response filed Sep. 20, 2017, 18 pages.
U.S. Appl. No. 14/797,492, Office Action dated Jan. 27, 2017, 14 pages.
U.S. Appl. No. 14/797,492, Office Action dated Oct. 5, 2017, 18 pages.
U.S. Appl. No. 14/797,492, Office Action dated Jul. 20, 2017, 17 pages.
"Office Action Issued in European Patent Application No. 16701888.6", dated May 22, 2018, 6 Pages.
Ammicht, et al., "Ambiguity Representation and Resolution in Spoken Dialogue Systems", In Proceedings of European Speech Processing Conference, Sep. 2001, 4 pages.
Sun, Ming, "Adapting Spoken Dialog Systems towards Domains and Users", In Thesis of Language Technologies Institute, School of Computer Science, Carnegie Mellon University, Retrieved on: Jul. 13, 2016, 82 pages.
U.S. Appl. No. 14/797,492, Sarikaya, et al., "Methods to Propagate Multiple Alternates in a Conversational Understanding System through Delayed Binding", filed Jul. 13, 2015.
"Summons to Attend Oral Hearings Issued in European Patent Application No. 16701888.6", Mailed Date: Jan. 15, 2019, 9 Pages.
"Notice of Allowance Issued in U.S. Appl. No. 14/797,492", dated Oct. 4, 2018, 9 Pages.
"First office action and Search Report Issued in Chinese Patent Application No. 201680005172.5", dated Jun. 5, 2019, 36 Pages.
"Notice of Allowance Issued in European Patent Application No. 16742518.0", dated May 20, 2019, 8 Pages.
"Non Final Office Action Issued in U.S. Appl. No. 14/591,603", dated May 29, 2019, 37 Pages.

\* cited by examiner

AMBIGUITY RESOLVING CONVERSATIONAL UNDERSTANDING SYSTEM

CROSS-REFERENCE TO RELATED APPLICATIONS

This application claims priority to U.S. Provisional Application Ser. No. 62/384,500, entitled "Ambiguity Resolving Conversational Understanding System," filed on Sep. 7, 2016, the entire disclosure of which is hereby incorporated herein by reference.

BACKGROUND

Conversational understanding systems receive user input, typically in the form of natural language and then interpret the input to determine an appropriate response or agent action to perform. Often, conversational understanding systems receive spoken input from a user, although alternatives are possible.

Conversational understanding systems are incorporated in many other systems such as a personal digital assistant (e.g., the CORTANA® software and services from Microsoft Corporation of Redmond, Wash., the GOOGLE NOW® software and services from Google Inc. of Mountain View, Calif., and the SIRI® software and services from Apple Inc. of Cupertino, Calif.) or search engines. Conversational understanding systems are used by these and other types of systems to receive input and instructions for performing various tasks such as performing a search, sending a message, scheduling an appointment, booking a reservation, etc.

It is important for conversational units to accurately determine what a user wants. But there are many potential sources of error that can lead to a conversational understanding unit providing incorrect results or taking an undesired action. For example, a user may not speak clearly, may mispronounce a word, may misspell a word, may use the wrong word, or may use a word that has multiple meanings. One technique to address these errors is to request feedback or confirmation from users before taking any action. But users often find responding to these requests tedious and irritating.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

A non-limiting example is a system or method for resolving ambiguity in a conversational understanding system. The method includes the steps of receiving a natural language input and identifying an agent action based on the natural language input. The method also includes the steps of determining an ambiguity value associated with the agent action and evaluating the ambiguity value against an ambiguity condition. The method includes the steps of when determined that the ambiguity value meets the ambiguity condition: selecting a prompting action based on the ambiguity associated with the identified agent action, performing the prompting action, receiving additional input in response to the prompting action, and updating the agent action to resolve the ambiguity based on the additional input. The method also includes the step of performing the agent action.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects.

DETAILED DESCRIPTION

Figure 1:
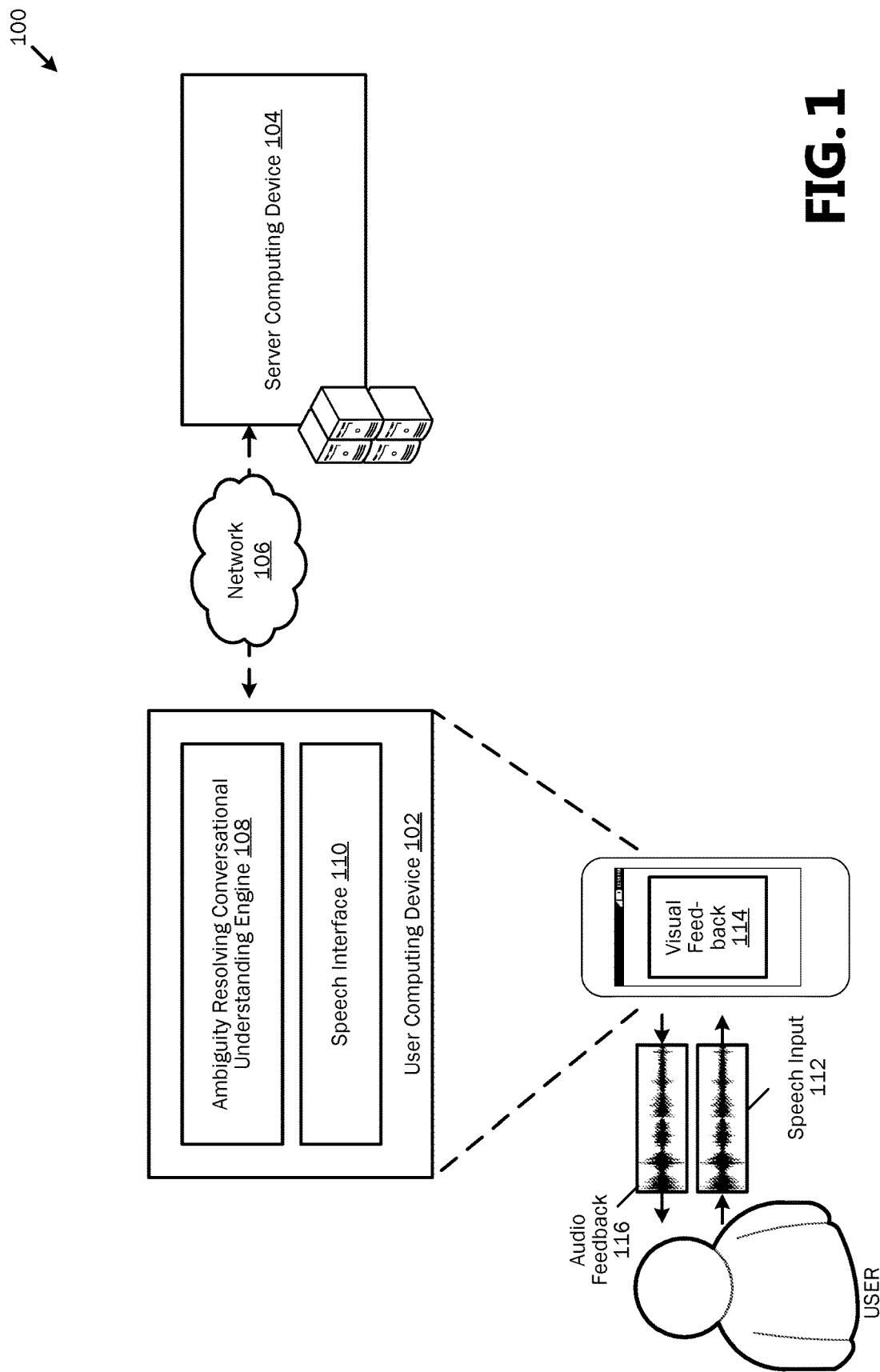
FIG. 1 is a schematic diagram of an example system for resolving ambiguity in a conversational understanding system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 is a schematic diagram of an example system 100 for resolving ambiguity in a conversational understanding system. In this example, the system 100 includes a user computing device 102 and a server computing device 104 that communicate over a network 106. The user computing device 102 may be any suitable computing device for implementing an ambiguity resolving conversation understanding engine 108 for interacting with a human user. For example, the user computing device 102 may be at least one of: a mobile telephone; a smart phone; a tablet; a phablet; a smart watch; a wearable computer; a personal computer; a desktop computer; a laptop computer; a gaming device/computer (e.g., the XBOX® gaming system from Microsoft Corporation of Redmond, Wash.); a media playback device (e.g., a BLUERAY® or DVD player, or streaming media player), a television; a navigation system; a vehicle telematics system; etc. This list is exemplary only and should not be considered as limiting.

In some aspects, the user computing device 102 includes an ambiguity resolving conversation understanding engine 108 and a speech interface 110. The ambiguity resolving conversation understanding engine 108 receives user input, such as speech input 112. Although alternatives are possible, the ambiguity resolving conversation understanding engine 108 receives user input via the speech interface 110. Additionally or alternatively, the ambiguity resolving conversation understanding engine 108 receives textual user input.

The ambiguity resolving conversation understanding engine 108 determines an agent action to perform based on the received user input. Depending on the user input, the ambiguity resolving conversation understanding engine 108 can perform many different types of agent actions. Non-limiting examples of agent actions include setting a reminder, storing a note, performing a search, initiating a phone call, sending a message (e.g., an SMS or e-mail), scheduling an appointment, making a reservation, and providing directions.

The ambiguity resolving conversation understanding engine 108 also determines whether the received user input is ambiguous. If so, the ambiguity resolving conversation understanding engine 108 determines whether to acknowledge the ambiguity to the user and whether to request additional input from the user to resolve the ambiguity. Based on the type and degree of ambiguity, the ambiguity resolving conversation understanding engine 108 determines an appropriate prompting action to resolve the ambiguity. The prompting action can include one or both of visual feedback 114, audio feedback 116.

In some aspects, the ambiguity resolving conversation understanding engine 108 interacts with the server computing device 104 over the network 106 for various purposes. For example, the ambiguity resolving conversation understanding engine 108 may request data from the server computing device 104 to determine an agent action. The ambiguity resolving conversation understanding engine 108 may transmit information to the server computing device 104 that can be combined with information from other devices and users to build a model for identifying and resolving ambiguity in user input. In some aspects, the ambiguity resolving conversation understanding engine 108 retrieves a model from the server computing device 104 for evaluating and resolving ambiguity. Typically, the model is generated using machine learning techniques based on data from many users captured from many devices.

The speech interface 110 provides an interface for the user to interact with the user computing device 102 with spoken language. In some aspects, the speech interface 110 includes an intelligent personal assistant that can perform tasks or services for the user. Non-limiting examples of an intelligent personal assistant include the CORTANA® software and services from Microsoft Corporation of Redmond, Wash., the GOOGLE NOW® software and services from Google Inc. of Mountain View, Calif., and the SIRI® software and services from Apple Inc. of Cupertino, Calif. In other aspects, the speech interface 110 comprises other types of applications or services such as a screen reader or dictation system.

Although in the example of FIG. 1, the ambiguity resolving conversation understanding engine 108 and the speech interface 110 are both in the user computing device 102, in other aspects, one or both of the ambiguity resolving conversation understanding engine 108 and the speech interface 110 are on the server computing device 104. In an example, the user computing device 102 transmits speech input 112 that is received to the server computing device 104 for recognition.

Figure 2:
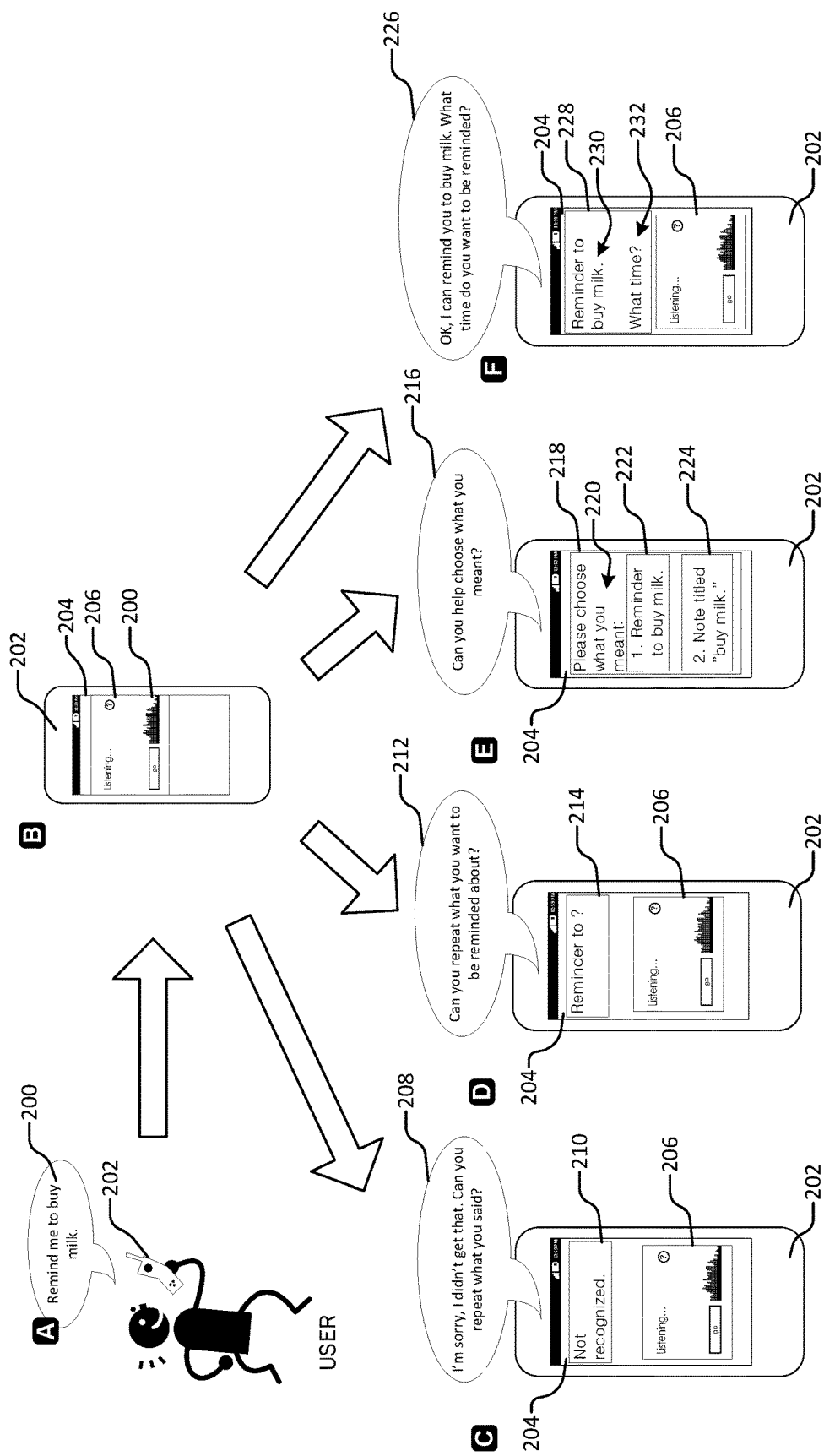
FIG. 2 is a schematic diagram of an example interaction between a user and an example user computing device of FIG. 1.

FIG. 2 is a schematic diagram of an example interaction between a user and a user computing device 202. This diagram illustrates an example operation of an ambiguity resolving conversation understanding engine, such as the ambiguity resolving conversation understanding engine 108, which is illustrated and described with respect to at least FIG. 1.

In this example, at A, the user provides spoken input 200 to a user computing device 202. More specifically, the user says "remind me to buy milk" to the user computing device 202. The user computing device 202 is an example of the user computing device 102, which is illustrated and described with respect to FIG. 1.

The user computing device 202 includes an ambiguity resolving conversation understanding engine 204 and a speech interface 206. At B, the speech interface 206 receives the spoken input 200 and the ambiguity resolving conversation understanding engine 204 determines an action to perform and whether there is any ambiguity about the input or the action to perform. Depending on the type and degree of ambiguity detected, the user computing device 202 generates feedback for the user. The provided feedback typically prompts the user for additional input that the user computing device 202 can use to resolve the ambiguity.

Examples of feedback generated by the user computing device 202 are provided at C-F. Typically, the user computing device 202 generates the feedback from only one of the examples. The examples are arranged from higher ambiguity to lower ambiguity.

As illustrated at C, the ambiguity resolving conversation understanding engine 204 generates feedback that includes audio feedback 208 and visual feedback 210. The audio feedback 208 says, "I'm sorry, I didn't get that. Can you repeat what you said?" The visual feedback 210 displays "not recognized" on a user interface of the user computing device 202. The ambiguity resolving conversation understanding engine 204 also continues to provide the speech interface 206 so that the ambiguity resolving conversation understanding engine 204 can receive the repeated spoken input from the user. This example is representative of a situation when the ambiguity resolving conversation understanding engine 204 determines that there is a significant amount of ambiguity in the recognition of the entirety of spoken input 200. The feedback generated by the ambiguity resolving conversation understanding engine 204 prompts the user to repeat the spoken input 200.

As illustrated at D, the ambiguity resolving conversation understanding engine 204 generates feedback that includes audio feedback 212 and visual feedback 214. The audio feedback 212 says, "Can you repeat what you want to be reminded about?" The visual feedback 214 displays "Reminder to?" on a user interface of the user computing device 202. The ambiguity resolving conversation understanding engine 204 also continues to provide the speech interface 206 so that the ambiguity resolving conversation understanding engine 204 can receive the spoken input from the user when the user repeats the subject of the reminder. This example is representative of a situation when the ambiguity resolving conversation understanding engine 204 determines that there is a significant amount of ambiguity in the recognition of a portion of the spoken input 200 (i.e., "buy milk") but that another portion did not include much ambiguity (i.e., "Remind me to"). The feedback provided in this example conveys confidence (i.e., low ambiguity) in the determination that a reminder should be created.

As illustrated at E, the ambiguity resolving conversation understanding engine 204 generates feedback that includes audio feedback 216 and visual feedback 218. The audio feedback 216 says, "Can you help choose what you meant?" The visual feedback 218 includes a prompt 220 that displays "Please choose what you meant:" on a user interface of the user computing device 202. The visual feedback 218 also includes option 222 ("1. Reminder to buy milk.") and option 224 ("2. Note titled 'buy milk.'"). Although not shown, in some aspects, the ambiguity resolving conversation understanding engine 204 also continues to provide the speech interface 206 so that the ambiguity resolving conversation understanding engine 204 can receive additional spoken input from the user to resolve the ambiguity. This example is representative of a situation when the ambiguity resolving conversation understanding engine 204 has a high level of confidence about the words in the spoken input, but ambiguity about the appropriate action to perform based on those words. Various aspects provide various options to resolve the ambiguity. For example, in some aspects, the user can select either option 222 or option 224 with a touch input on the screen of the user computing device 202. Alternatively, in some aspects, the user can speak a portion of an option to select or say a number associated with the option (e.g., 1 or "reminder" to select option 222, 2 or "note" to select option 224).

As illustrated at F, the ambiguity resolving conversation understanding engine 204 generates feedback that includes audio feedback 226 and visual feedback 228. The audio feedback 216 says, "OK, I can remind you to buy milk. What time do you want to be reminded?" The visual feedback 218 includes a confirmatory statement 230 ("Reminder to buy milk") and a follow-on question 232 ("What time?"). The ambiguity resolving conversation understanding engine 204 also continues to provide the speech interface 206 so that the ambiguity resolving conversation understanding engine 204 can receive the spoken input from the user when the user answers the follow-on question 232. This example is representative of a situation when the ambiguity resolving conversation understanding engine 204 has a high level of confidence about the words in the spoken input and the action to perform based on those words. The confirmatory statement 230 tells the user what action the ambiguity resolving conversation understanding engine 204 and because more information is needed to answer the follow-on question 232, the user has an opportunity to stop/alter the action if it is incorrect.

The various examples illustrated at C-F are just examples and there are many other types of feedback that can be generated by the ambiguity resolving conversation understanding engine 204. Techniques that some aspects use to evaluate ambiguity and select appropriate user feedback to address the ambiguity are discussed in further detail throughout. Some aspects balance the goals of eliminating ambiguity against the goal of minimizing the amount of times the user is prompted for information based.

Figure 3:
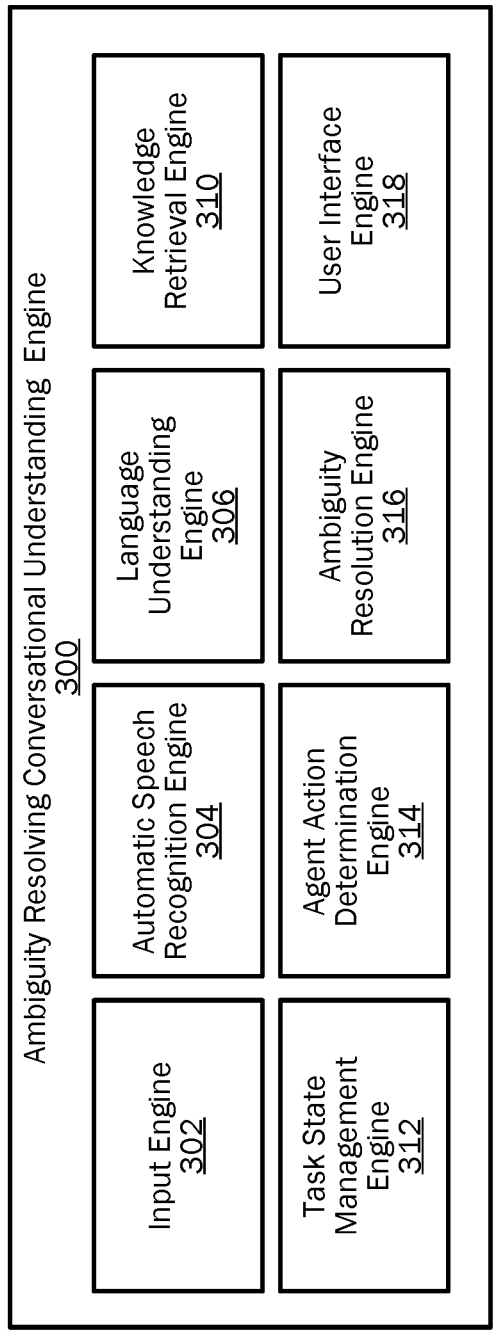
FIG. 3 is a schematic block diagram of an example ambiguity resolving conversation understanding engine of FIG. 1.

FIG. 3 is a schematic block diagram of an ambiguity resolving conversation understanding engine 300. The ambiguity resolving conversation understanding engine 300 is an example of the ambiguity resolving conversation understanding engine 108 shown in FIG. 1. The ambiguity resolving conversation understanding engine 300 includes an input engine 302, an automatic speech recognition engine 304, a language understanding engine 306, a knowledge retrieval engine 310, a task state management engine 312, an agent action determination engine 314, an ambiguity resolution engine 316, and a user interface engine 318.

The input engine 302 receives input from various sources. For example, the input engine 302 can receive spoken language input from a speech interface. The input engine 302 can also receive textual input from such as may be typed by a user. The input engine 302 can also receive speech or textual input from another computing device, such as via a network transmission.

The automatic speech recognition engine 304 recognizes words (or other parts of speech) in a spoken input. In some aspects, the automatic speech recognition engine 304 determines a confidence score for the recognized words (or other parts of speech). The language understanding engine 306 applies a language understanding model to the words that are recognized by the automatic speech recognition engine 304 or that have been otherwise received (e.g., as textual input). The language understanding engine 306 uses the language understanding model to infer the user's intention.

The knowledge retrieval engine 310 retrieves knowledge from one or more local or remote data sources. For example, if the user input includes the words "call Henry," the knowledge retrieval engine 310 may access an address book data source to look for contacts named Henry.

The task state management engine 312 accesses information/context associated with a current task state (or belief state) and/or updates a current task state based on the input. For example, the task state management engine 312 may determine that an input "buy milk" is related to a previously initiated task to generate a reminder and will use that input to generate a reminder to buy milk rather than evaluating "buy milk" as an independent statement.

The agent action determination engine 314 determines an agent action to be performed based on the user input. The ambiguity resolution engine 316 evaluates the ambiguity associated with the user input and the determine agent action to determine whether and how to seek additional input from the user before performing the agent action.

The user interface engine 318 generates user interfaces based on the user input. For example, if an agent action is performed, the user interface engine 318 may generate a user interface to indicate the agent action has been performed and, if appropriate, show the results of performing the agent action. The user interface engine 318 may also generate a user interface to query the user to request additional input before proceeding with performing an agent action.

Figure 4:
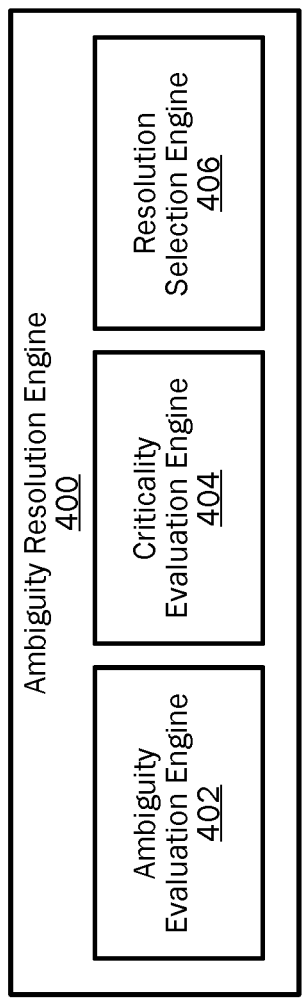
FIG. 4 is a schematic block diagram of an ambiguity resolution engine of FIG. 3.

FIG. 4 is a schematic block diagram of an ambiguity resolution engine 400. The ambiguity resolution engine 400 is an example of the ambiguity resolution engine 316 shown in FIG. 3. The ambiguity resolution engine 400 includes an ambiguity evaluation engine 402, a criticality evaluation engine 404, and a resolution selection engine 406.

The ambiguity evaluation engine 402 quantifies the ambiguity at various points during the conversational understanding process. The ambiguity evaluation engine 402 may use various statistical confidence values generated by at least some of the components of the input engine 302, which are discussed in further detail with respect to FIG. 3.

The criticality evaluation engine 404 evaluates the criticality of the identified agent action. Criticality refers to the consequences of performing a particular agent action when it is not desired. An agent action with high criticality would have larger consequences if it were performed when not desired. Transactional agent actions often have high criticality. Examples of transactional agent actions that would have a higher criticality include transmitting a message to another user/device and initiating a bank transaction. In contrast, agent actions with low criticality have smaller consequences if performed when not desired. Informational agent actions often have low criticality. For example, an informational agent action to retrieve movie listings would have a lower criticality. In some aspects, criticality is based on whether the action is reversible (e.g., sending a message).

The resolution selection engine 406 determines whether additional input is required from the user to resolve an ambiguity related to a particular agent action that may be performed. Generally, if further input is not required to resolve the ambiguity, the agent action will be performed (or at least a step in the identified agent action will be performed). If further input is required to resolve the ambiguity, the resolution selection engine 406 will determine how to request the additional information. For example, the resolution selection engine 406 may determine that particular visual or audio feedback should be provided to the user to prompt the user to provide additional information to resolve the ambiguity. The feedback may expressly or impliedly indicate that an ambiguity has been identified.

Various factors are considered to determine whether to seek further user input to resolve ambiguity. For example, the various ambiguities may be quantified and evaluated against one or more conditions. If the conditions are satisfied, the resolution selection engine 406 may determine it is not necessary to seek additional user input to resolve the ambiguity. The conditions may be based on various factors. For example, if the determined agent action has a high criticality, a condition might require a very low ambiguity score (or high confidence score) to proceed without additional user input. As another example, if the user has recently been asked for additional information, the condition might be adjusted so that a higher ambiguity score would still satisfy the condition (e.g., so as not to irritate the user with too many requests for information). In some aspects, a condition will require a lower ambiguity score if the user is in the middle of a lengthy or complex task so as to minimize the user frustration that would occur if the system incorrectly exits out of a long task requiring the user to redo many steps.

The resolution selection engine 406 considers various factors to determine how to resolve an ambiguity. For example, if two alternative agent actions are identified as likely, the resolution selection engine 406 may prompt the user to select one of the options. Alternatively, if there is ambiguity with regard to a single identified agent action, the resolution selection engine 406 may prompt the user to confirm the action. As another alternative, if the ambiguity prevents fully defining the agent action, the resolution selection engine 406 may prompt the user to provide (or clarify) missing information that is necessary to define the agent action.

Some example techniques (or prompting actions) that can be selected to resolve ambiguity include implicit verbal feedback, implicit visual feedback, explicit verbal feedback with natural language understanding/policy hints, explicit verbal feedback, asking for repetition, asking again, and presenting alternatives. Examples of these techniques are illustrated and described with respect to at least FIGS. 7-15

Figure 5:
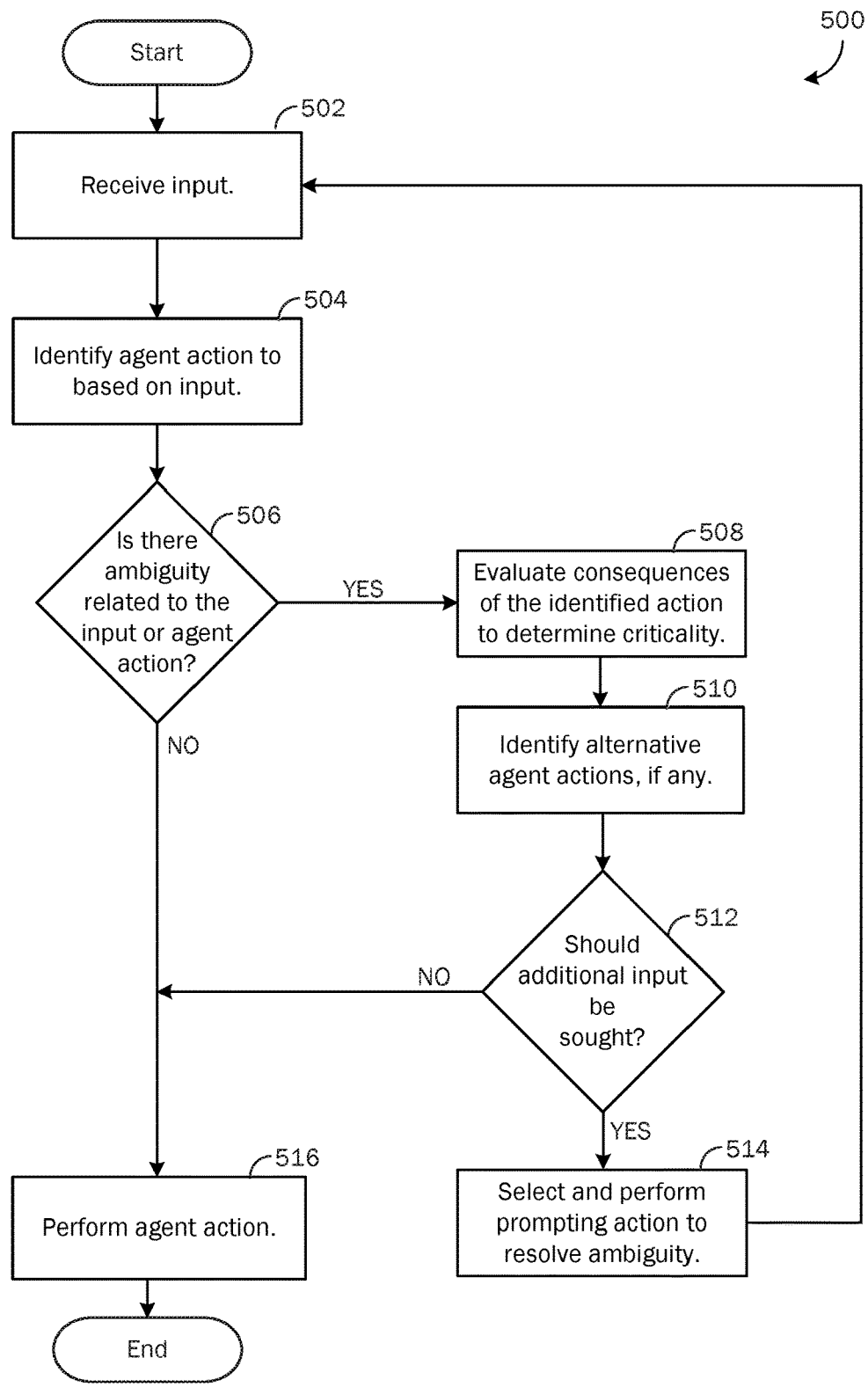
FIG. 5 illustrates an example method of resolving ambiguity in a conversation understanding system performed by some aspects of the system of FIG. 1.

FIG. 5 illustrates an example method 500 of resolving ambiguity in a conversation understanding system performed by some aspects of the system 100. In examples, the method 500 may be executed on a device comprising at least one processor configured to store and execute operations, programs, or instructions.

At operation 502, input is received. As described above, the input may be a spoken input, textual input, or another type of input. The input may be received directly from a user or may be transmitted by another computing device.

At operation 504, an agent action is identified based on the input. Identifying the agent action may include performing automatic speech recognition, language understanding, knowledge retrieval, and task state management.

At operation 506, it is determined whether there is ambiguity related to the input or identified agent action. In various aspects, various factors are considered in determining whether there is ambiguity related to the identified agent action. For example, the automatic speech recognition may generate a confidence score, and the language understanding engine may generate a language modeling likelihood score (e.g., how often users state something similar) and a language understanding semantic score (e.g., does this utterance make sense for a particular domain/intent?), post-knowledge retrieval contextual update (e.g., impact of retrieving information from additional data sources including lists, dictionaries, databases or other web services and sources), and relationship to previous utterances in same session (computed in the belief state update). Additional the presence of viable alternates at any point in the conversation understanding process can indicate potential ambiguity about the outcome. Some or all of these factors may be used to calculate an ambiguity score.

Determining whether there is ambiguity may comprise comparing an ambiguity score (or confidence score) to a particular threshold. In some aspects, there are multiple ambiguity scores that relate to various parts of the conversational understanding process. In some aspects, these multiple scores are individually compared to one or more threshold values to determine if there is ambiguity (e.g., if any of the scores exceeds a threshold, it is determined that there is ambiguity). Alternatively, in some aspects, the multiple scores are considered together to determine whether there is ambiguity (e.g., if a first ambiguity score exceeds a first threshold and a second ambiguity score exceeds a second threshold, it is determined that there is ambiguity). Various combinations and alternatives are also possible.

If it is determined that there is ambiguity, the method proceeds to operation 508. If instead, it is determined that there is not ambiguity the method proceeds to operation 516 where the agent action is performed. After operation 516, the method ends.

At operation 508, the consequences of the identified action are evaluated to determine the criticality of the identified action. The criticality may be evaluated as a quantitative or qualitative score. As described above, the criticality relates to the severity of the consequences of incorrectly performing the identified agent action.

At operation 510, alternative agent actions are identified. However, depending on the input, there may not be any appropriate alternative agent actions to identify.

At operation 512, it is determined whether additional input should be sought. If so, the method proceeds to operation 514. If not the method proceeds to operation 516, where the agent action is performed. As described previously, various factors are considered in determined whether to seek additional input. Additionally, in some aspects, machine learning techniques are used to build a model of when to seek input.

At operation 514, a prompting action to resolve the ambiguity is selected and performed. The prompting action may comprise one or both of an audio or visual prompt to repeat some or all of a previous input, to select an option, or to provide additional information. In some aspects, selecting a prompting action comprises determining whether to present any of the alternative agent actions identified by operation 510 to the user. After the prompting action is performed, the method returns to operation 502 where the process is repeated using new input received in response to the prompting action.

Figure 6:
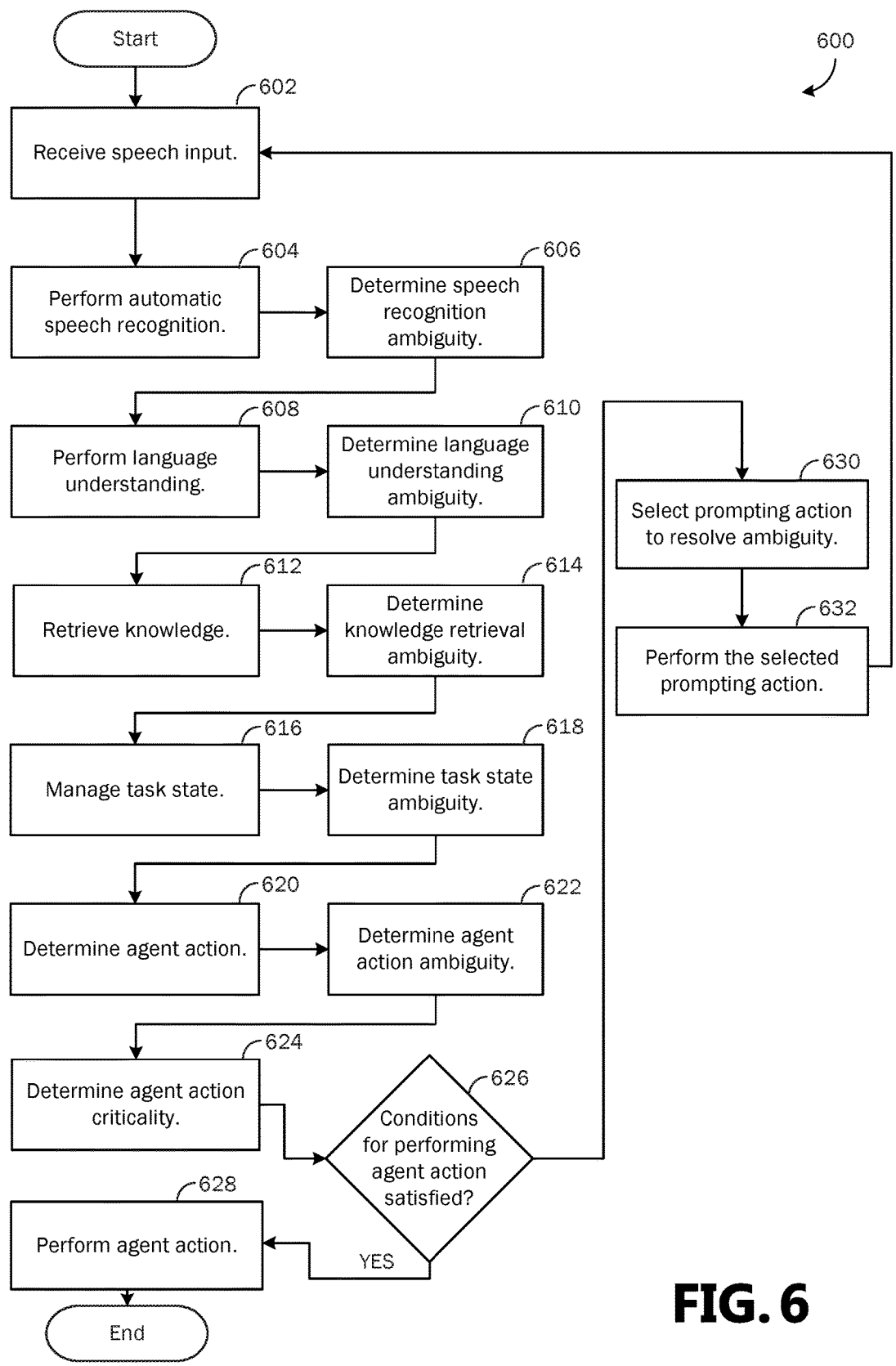
FIG. 6 illustrates an example method of resolving ambiguity in speech input to a conversation understanding system performed by some aspects of the system of FIG. 1.

FIG. 6 illustrates an example method 600 of resolving ambiguity in speech input to a conversation understanding system performed by some aspects of the system 100. In examples, the method 600 may be executed on a device comprising at least one processor configured to store and execute operations, programs, or instructions.

At operation 602, input is received. Operation 602 may be similar to previously described operation 502.

At operation 604, automatic speech recognition is performed on the speech input to recognize words in the speech input. At operation 606, the speech recognition ambiguity is determined. The speech recognition ambiguity can, for example, be determined based on a confidence score for some or all of the speech recognition results. In some aspects, if the speech recognition ambiguity exceeds a threshold, the method 600 proceeds to operation 630, where a prompting action is selected to resolve the ambiguity. In this manner, the method 600 avoids performing many of the steps in conversational understanding based on highly ambiguous automatic speech recognition results.

At operation 608, language understanding is performed on the words recognized in the speech input. At operation 610, the language understanding ambiguity is determined. The language understanding ambiguity can, for example, be determined based on a confidence score for some or all of the language understanding results. In some aspects, if the language recognition ambiguity exceeds a threshold, the method 600 proceeds to operation 630, where a prompting action is selected to resolve the ambiguity. In this manner, the method 600 avoids performing some of the steps in conversational understanding when the language understanding results are highly ambiguous.

At operation 612, knowledge is retrieved to aid in determining an agent action to perform based on the speech input. The knowledge is retrieved based on the language understanding of the speech input from operation 608. As described above, the knowledge retrieval can be used to retrieve information from internal or external data sources. For example, if the language understanding determines that the user wants to initiate a phone call to "Lauren," the knowledge retrieval can check a contacts data store for contacts named Lauren.

At operation 614, the knowledge retrieval ambiguity is determined. The language understanding ambiguity can, for example, be determined based on a confidence score for some or all of the records retrieved or based on the number of matching records. Continuing the example speech input to initiate a phone call to Lauren, if multiple contacts named Lauren are found in the user's address book, it may be determined there is a lot of ambiguity related to the knowledge retrieved. In some aspects, if the knowledge retrieval ambiguity exceeds a threshold, the method 600 proceeds to operation 630, where a prompting action is selected to resolve the ambiguity. In this manner, the method 600 avoids performing some of the steps in conversational understanding when the knowledge retrieval results are highly ambiguous.

At operation 616, task state management is performed based. Task state management may comprise determining a current task status and updating the task status based on the language understanding and knowledge retrieved based on the speech input received in operation 602. At operation 618, the task state ambiguity is determined. The task state ambiguity can, for example, be determined based on a confidence score for task state (e.g., whether the language understanding results and knowledge retrieved make sense in light of the task state). In some aspects, if the task state ambiguity exceeds a threshold, the method 600 proceeds to operation 630, where a prompting action is selected to resolve the ambiguity. In this manner, the method 600 avoids determining an agent action when the when the task state management results are highly ambiguous.

At operation 620, an agent action is determined based on the speech input. As described previously, a great variety of agent actions can be performed depending on the speech input. At operation 622, the agent action ambiguity is determined. The agent action ambiguity may be based on how confident the system is that the determined agent action fits the speech input. Because the speech input is provided as a natural language input and does not necessarily include any particular command language or keywords, multiple agent actions may appear to be potentially appropriate. In this situation, the determined agent action may be determined to have ambiguity.

At operation 624, an agent action criticality is determined. As described above, the criticality of the agent action refers to the severity of the consequences of performing the action when the user does not want it to be performed (i.e., when it is not the user's intended outcome for the speech input).

At operation 626, it is determined whether the conditions for performing the identified agent action are satisfied. For example, the conditions may include a maximum ambiguity level for each of the previous steps in the conversational understanding process. Another condition may relate to the total ambiguity across all of the preceding steps in the conversational understanding process. In some aspects, a numerical score is determined for each of the determined ambiguities and those scores are combined and compared to a maximum threshold. In some aspects, the numerical scores are weighted before being combined. In some aspects the threshold is adjusted based on the criticality of the agent action (e.g., if the agent action has a higher criticality, the threshold is lowered to limit the total ambiguity).

If it is determined the conditions for performing the agent action are satisfied, the method 600 proceeds to operation 628 where the agent action is performed. If not, the method proceeds to operation 630.

At operation 630, a prompting action is selected to resolve the ambiguity. The prompting action provides feedback to the user, which may be either audio, visual, or both, to provide additional input that can be used to resolve the identified ambiguity. At operation 632, the selected prompting action is performed. Thereafter, the method returns to operation 602 where the method is repeated using the new input.

Figure 7:
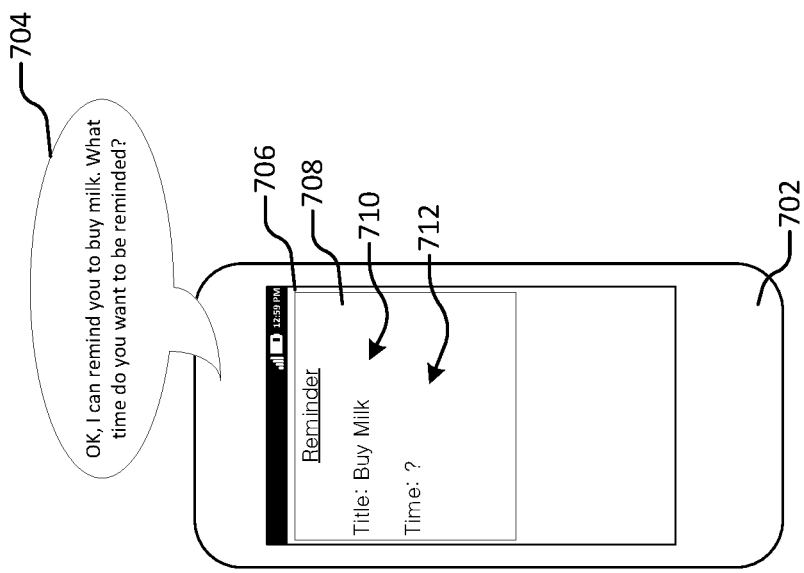
FIG. 7 is a schematic diagram of an example interaction between a user and an example user computing device of FIG. 1.
Figure 7:
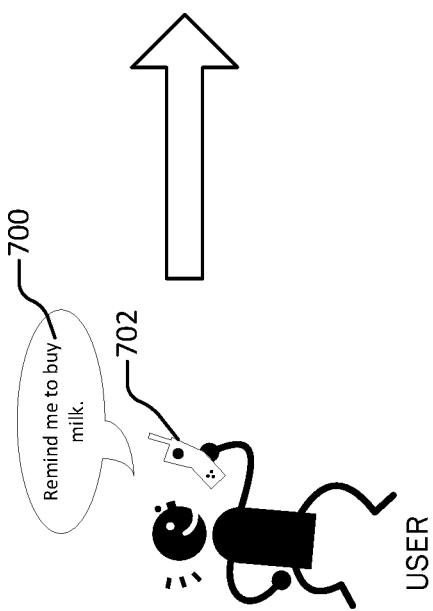

FIG. 7 is a schematic diagram of an example interaction between a user and a user computing device 702. The user computing device 702 is an example of the user computing device 102. This diagram illustrates an example prompting action generated by a system such as the system 100, which is illustrated and described with respect to at least FIG. 1. In this example, the prompting action provides implicit audio feedback.

In this example, the user provides the spoken input 700, saying "Remind me to buy milk." In response, the user computing device 702 provides audio feedback 704 and visual feedback 706. The audio feedback 704 says "OK, I can remind you to buy milk. What time do you want to be reminded?" The visual feedback 706 includes a reminder 708. The reminder includes a title field 710, which displays "Buy Milk" and a time field 712, which displays "?".

Figure 8:
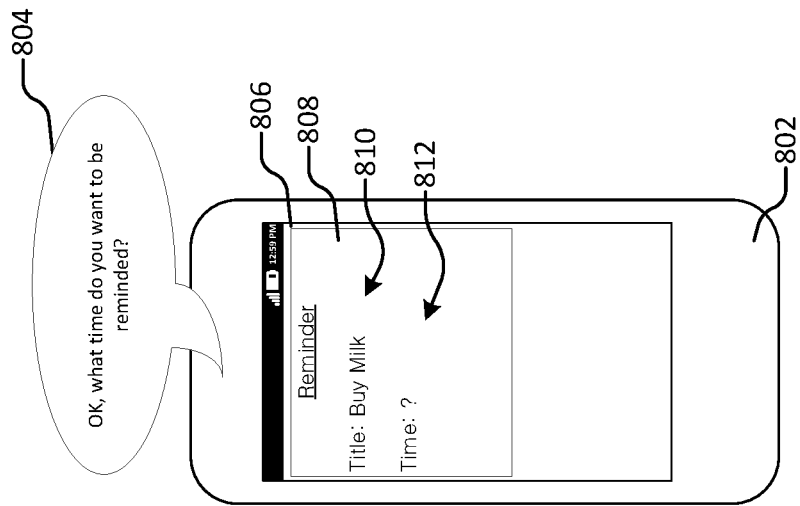
FIG. 8 is a schematic diagram of an example interaction between a user and an example user computing device of FIG. 1.
Figure 8:
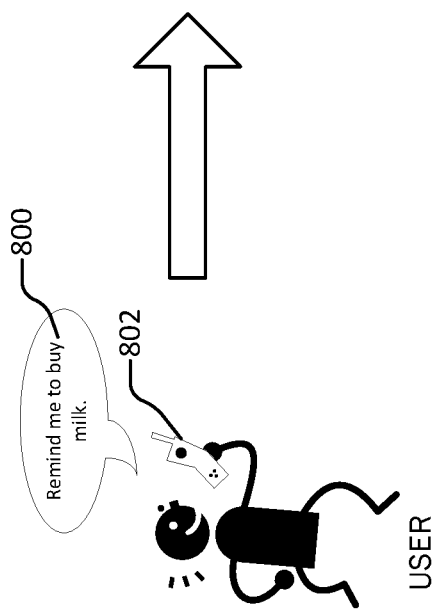

FIG. 8 is a schematic diagram of an example interaction between a user and a user computing device 802. The user computing device 802 is an example of the user computing device 102. This diagram illustrates an example prompting action generated by a system such as the system 100, which is illustrated and described with respect to at least FIG. 1. In this example, the prompting action provides implicit audio feedback.

In this example, the user provides the spoken input 800, saying "Remind me to buy milk." In response, the user computing device 802 provides audio feedback 804 and visual feedback 806. The audio feedback 804 says "OK, what time do you want to be reminded?" The visual feedback 806 includes a reminder 808. The reminder includes a title field 810, which displays "Buy Milk" and a time field 812, which displays "?".

Implicit visual feedback allows the system to display its understanding of the spoken input 800 separate from the actual conversation flow and to indicate its current knowledge, without asking the user to confirm or reject anything. In this manner, the user is aware of the system's current belief and can decide to correct the system if necessary but otherwise the conversation flow is uninterrupted.

Figure 9:
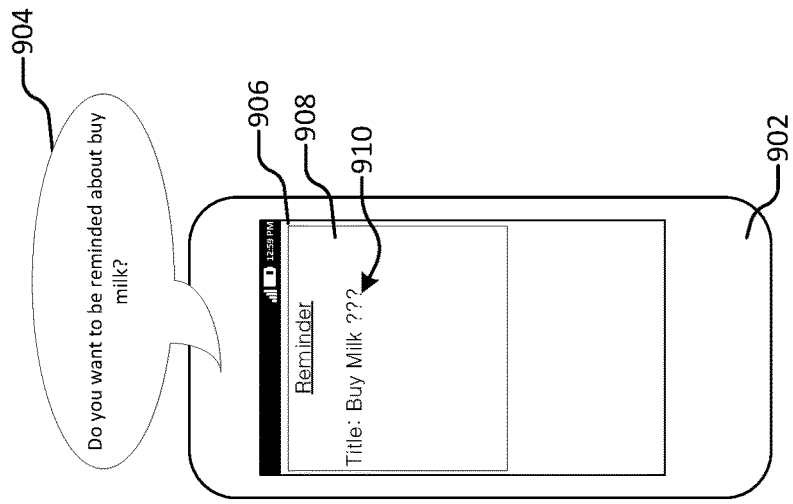
FIG. 9 is a schematic diagram of an example interaction between a user and an example user computing device of FIG. 1.
Figure 9:
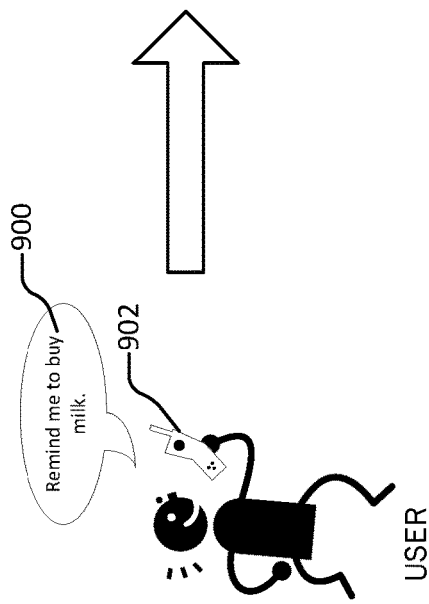

FIG. 9 is a schematic diagram of an example interaction between a user and a user computing device 902. The user computing device 902 is an example of the user computing device 102. This diagram illustrates an example prompting action generated by a system such as the system 100, which is illustrated and described with respect to at least FIG. 1. In this example, the prompting action provides explicit audio feedback with natural language understanding.

In this example, the user provides the spoken input 900, saying "Remind me to buy milk." In response, the user computing device 902 provides audio feedback 904 and visual feedback 906. The audio feedback 904 says "Do you want to be reminded about buy milk?" The visual feedback 906 includes a reminder 908. The reminder includes a title field 810, which displays "Buy Milk" and a time field 812, which displays "?".

In this example, the system explicitly repeats back what the user said and asks the user to confirm. Additionally, the system provides an indication of what agent action would be performed. This explicit audio feedback is useful if the system determines that there is a high level of ambiguity (e.g., the system lacks confidence in tis understanding) and the system has identified only one potential agent action. The indication of the agent action alerts the user as to what the system would do if the user replies in affirmative.

Figure 10:
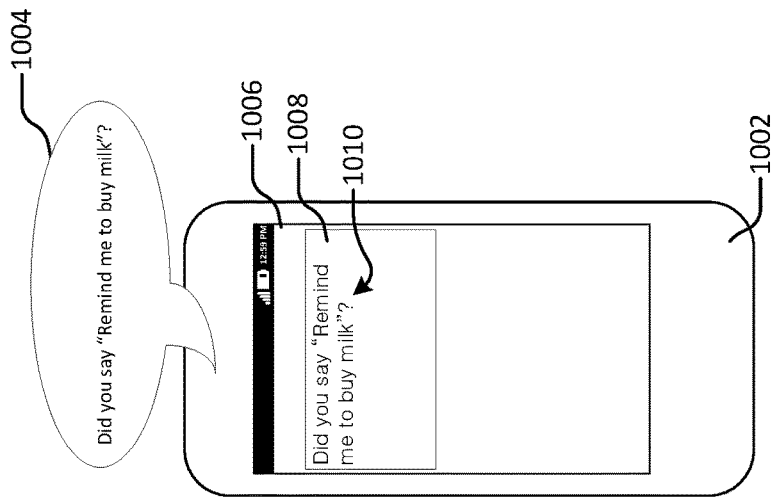
FIG. 10 is a schematic diagram of an example interaction between a user and an example user computing device of FIG. 1.
Figure 10:
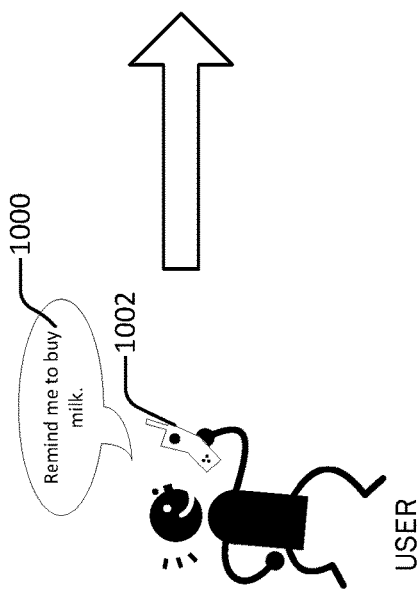

FIG. 10 is a schematic diagram of an example interaction between a user and a user computing device 1002. The user computing device 1002 is an example of the user computing device 102. This diagram illustrates an example prompting action generated by a system such as the system 100, which is illustrated and described with respect to at least FIG. 1. In this example, the prompting action provides explicit audio feedback.

In this example, the user provides the spoken input 1000, saying "Remind me to buy milk." In response, the user computing device 1002 provides audio feedback 1004 and visual feedback 1006. The audio feedback 1004 says "Did you say 'Remind me to buy milk'?" The visual feedback 1006 includes a message panel 1008 that displays the message "Did you say 'Remind me to buy milk'?"

In this example, the system explicitly repeats back what the user said and asks the user for confirmation from the user. This explicit verbal feedback is useful if the system determines there is a high level of ambiguity (e.g., the system lacks confidence in its understanding) and the system has identified only one potential agent action or has not yet even identified an agent action based on the degree of ambiguity.

Figure 11:
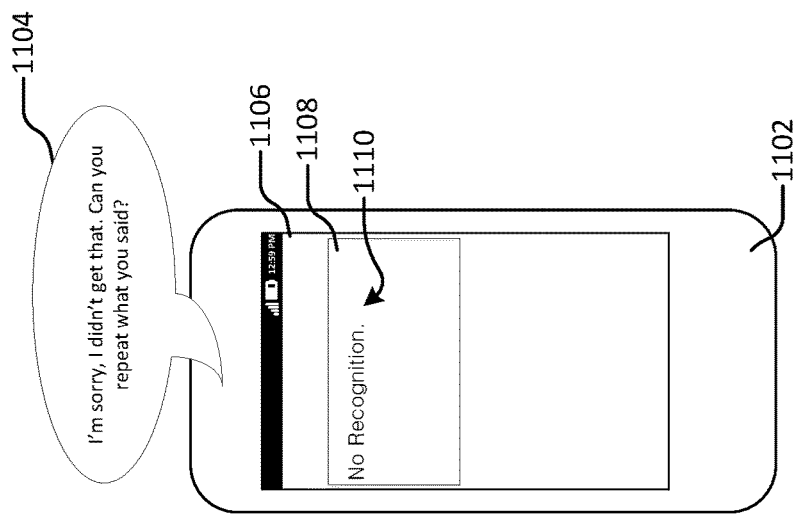
FIG. 11 is a schematic diagram of an example interaction between a user and an example user computing device of FIG. 1.
Figure 11:
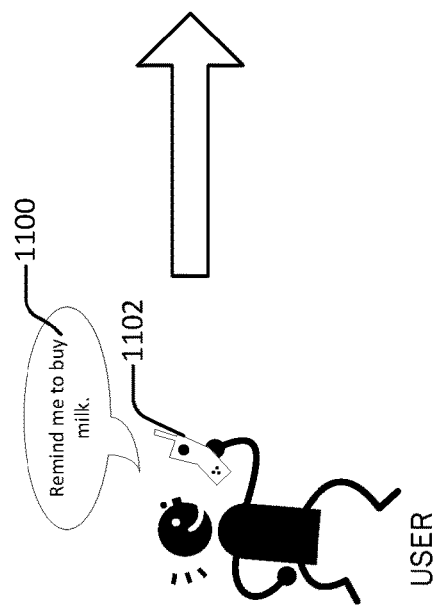

FIG. 11 is a schematic diagram of an example interaction between a user and a user computing device 1102. The user computing device 1102 is an example of the user computing device 102. This diagram illustrates an example prompting action generated by a system such as the system 100, which is illustrated and described with respect to at least FIG. 1. In this example, the prompting action simply asks the user to repeat the spoken input 1200.

In this example, the user provides the spoken input 1100, saying "Remind me to buy milk." In response, the user computing device 1102 provides audio feedback 1104 and visual feedback 1106. The audio feedback 1104 says "I'm sorry, I didn't get that. Can you repeat what you said?" The visual feedback 1106 includes a message panel 1108 that displays the message "No recognition."

In this example, the system asks the user to repeat the spoken input. This strategy of asking again can be useful in case of highly ambiguous automatic speech recognition results (e.g., low ASR confidence) when multiple potential recognition values are identified. The system can use information from processing the repeated spoken input along with the automatic speech recognition results from processing the spoken input 1100 to determine the correct recognition result.

Figure 12:
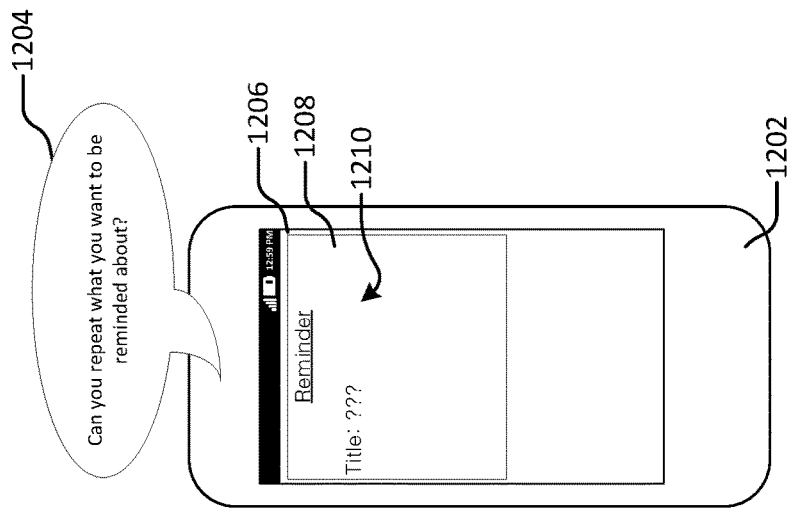
FIG. 12 is a schematic diagram of an example interaction between a user and an example user computing device of FIG. 1.
Figure 12:
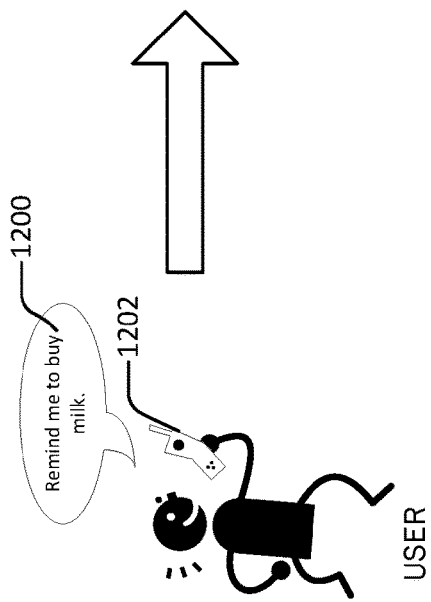

FIG. 12 is a schematic diagram of an example interaction between a user and a user computing device 1202. The user computing device 1202 is an example of the user computing device 102. This diagram illustrates an example prompting action generated by a system such as the system 100, which is illustrated and described with respect to at least FIG. 1. In this example, the prompting action asks the user to repeat a portion of the spoken input 1200.

In this example, the user provides the spoken input 1200, saying "Remind me to buy milk." In response, the user computing device 1202 provides audio feedback 1204 and visual feedback 1206. The audio feedback 1204 says "Can you repeat what you want to be reminded about?" The visual feedback 1206 includes a reminder 1208 with a title field that displays "?".

In this example, the system indicates to the user that a reminder will be created and asks the user to repeat the portion of the spoken input that corresponds to the subject of the reminder. This strategy of asking for partial repetition can be useful in case of highly ambiguous automatic speech recognition results (e.g., low ASR confidence) for a portion of the spoken input 1200 and when multiple (or no) potential recognition values are identified. The system can use information from processing the repeated spoken input portion along with the automatic speech recognition results from processing the spoken input 1200 to determine the correct recognition result.

Figure 13:
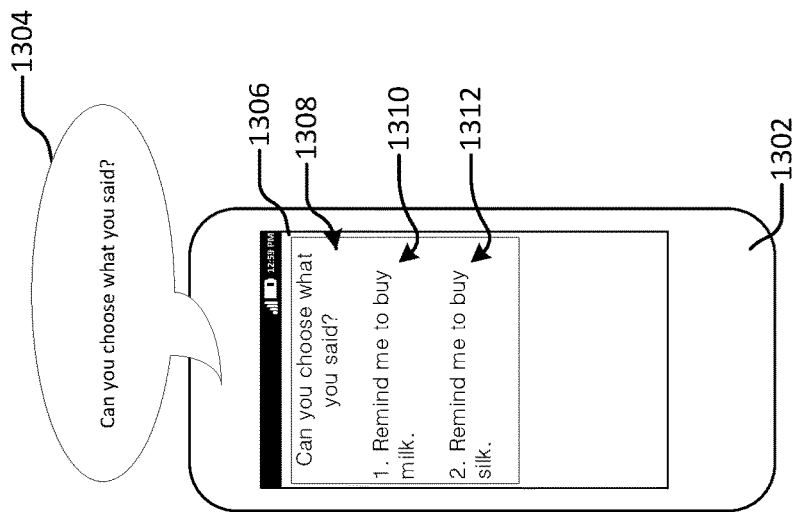
FIG. 13 is a schematic diagram of an example interaction between a user and an example user computing device of FIG. 1.
Figure 13:
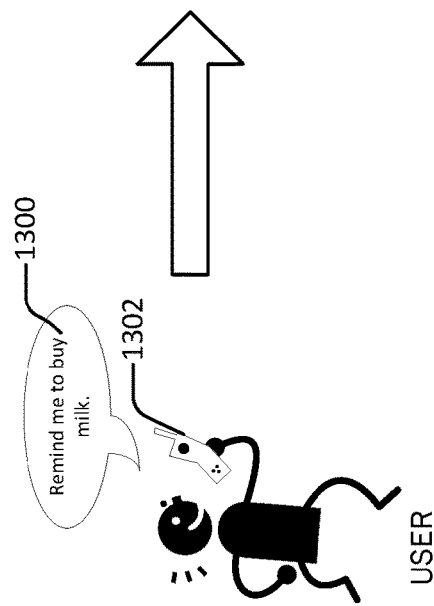
Figure 14:
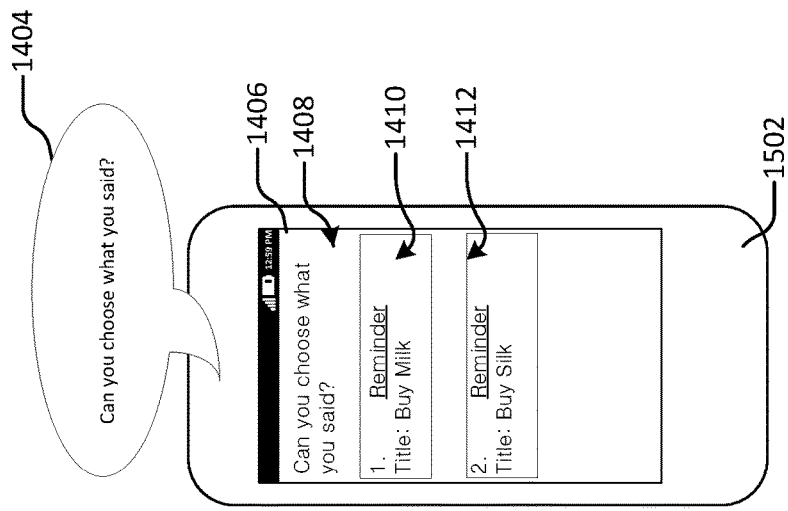
FIG. 14 is a schematic diagram of an example interaction between a user and an example user computing device of FIG. 1.
Figure 14:
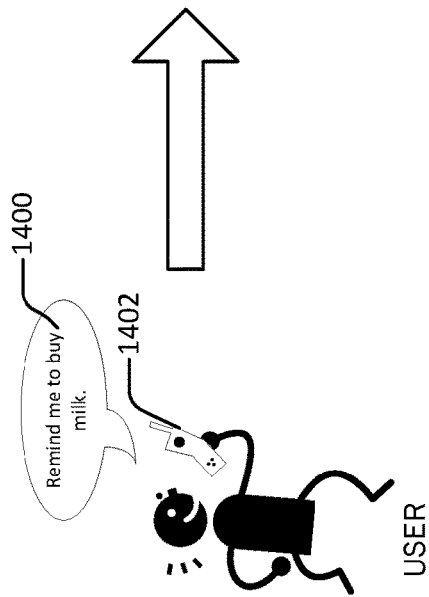
Figure 15:
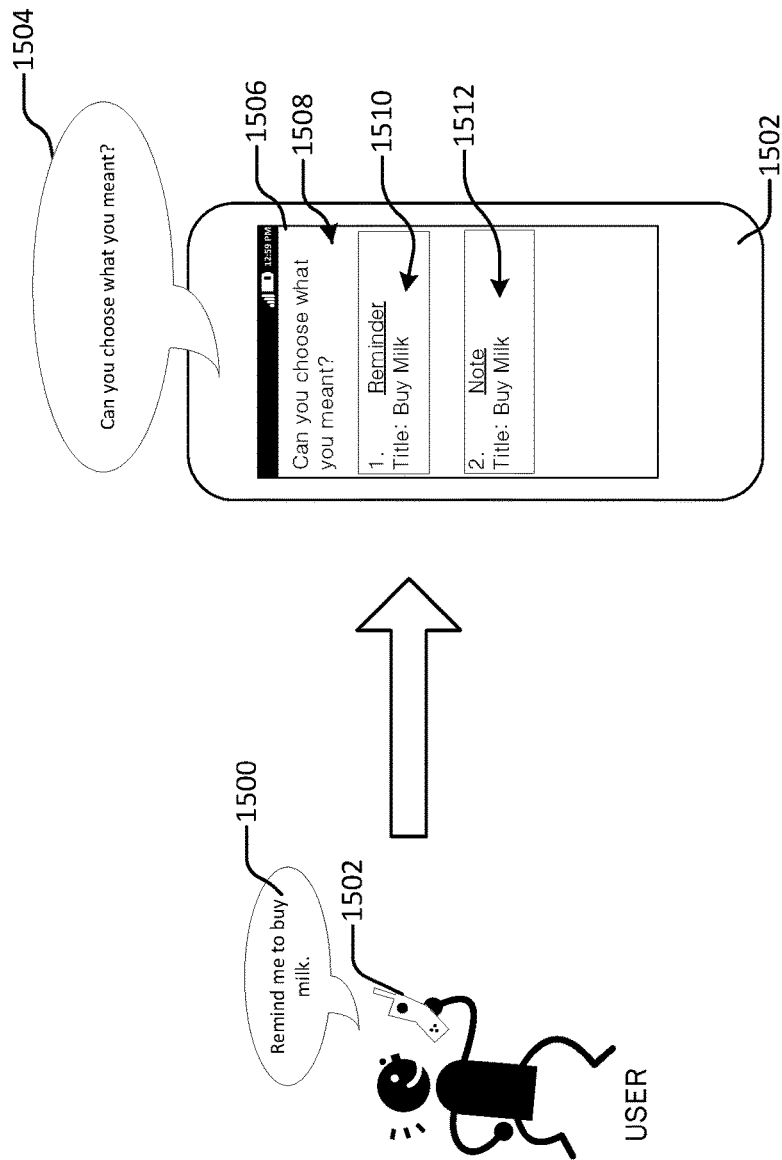
FIG. 15 is a schematic diagram of an example interaction between a user and an example user computing device of FIG. 1.

FIGS. 13-15 include schematic block diagrams of interactions where the user is asked to select from a plurality of alternates. This strategy of presenting alternatives is useful when multiple good candidates are identified with sufficient ambiguity so that the user can then quickly identify the intended input or action.

FIG. 13 is a schematic diagram of an example interaction between a user and a user computing device 1302. The user computing device 1302 is an example of the user computing device 102. This diagram illustrates an example prompting action generated by a system such as the system 100, which is illustrated and described with respect to at least FIG. 1. In this example, the prompting action asks the user to select between alternative transcriptions of a spoken input 1300.

In this example, the user provides the spoken input 1300, saying "Remind me to buy milk." In response, the user computing device 1302 provides audio feedback 1304 and visual feedback 1306. The audio feedback 1304 says "Can you choose what you said?" The visual feedback 1306 includes a prompt text 1308, which says "Can you choose what you said?" The visual feedback 1305 also includes a first option 1310 ("1. Remind me to buy milk") and a second option 1312 ("2. Remind me to buy silk").

FIG. 14 is a schematic diagram of an example interaction between a user and a user computing device 1402. The user computing device 1402 is an example of the user computing device 102. This diagram illustrates an example prompting action generated by a system such as the system 100, which is illustrated and described with respect to at least FIG. 1. In this example, the prompting action asks the user to select between potential reminders that are based on alternative recognitions of a spoken input 1400.

In this example, the user provides the spoken input 1400, saying "Remind me to buy milk." In response, the user computing device 1402 provides audio feedback 1404 and visual feedback 1406. The audio feedback 1404 says "Can you choose what you said?" The visual feedback 1406 includes a prompt text 1408, which says "Can you choose what you said?" The visual feedback 1406 also includes a first reminder 1410, which has a title of "Buy Milk," and a second reminder 1412, which has a title of "Buy Silk."

FIG. 15 is a schematic diagram of an example interaction between a user and a user computing device 1502. The user computing device 1502 is an example of the user computing device 102. This diagram illustrates an example prompting action generated by a system such as the system 100, which is illustrated and described with respect to at least FIG. 1. In this example, the prompting action asks the user to select between alternative potential actions based on a spoken input 1500.

In this example, the user provides the spoken input 1500, saying "Remind me to buy milk." In response, the user computing device 1502 provides audio feedback 1504 and visual feedback 1506. The audio feedback 1504 says "Can you choose what you meant?" The visual feedback 1506 includes a prompt text 1508, which says "Can you choose what you meant?" The visual feedback 1506 also includes a reminder 1510, which has a title of "Buy Milk," and a note 1512, which has a title of "Buy Silk." The user can respond to indicate whether to create a note or reminder.

When presenting alternates to the user, the system can also consider multiple types of alternates from various points in the conversational understanding process (e.g., automatic speech recognition, action determination, etc.). For instance, the system can show different automatic speech recognition alternates, or language understanding hypotheses, or different post-knowledge fetch results, or even alternate options from task (or belief) state update that can provide the user different options. In some aspects, the alternates from the later steps of the conversation understanding rocess are selected for display (e.g., language understanding rather than automatic speech recognition) unless significant ambiguity exists at the earlier steps (e.g., automatic speech recognition has low confidence). Beneficially, the alternates generate from the later steps in the process will typically provide users with a better understanding of the system's current interpretation and intentions.

The choice of which method to use and which alternates (and which abstraction) to present to a user can be made through various ways. In some aspects, a rule-based system uses various confidence thresholds with rules to determine the best choice for a given situation. Some aspects use a statistical machine learning model (discriminative or generative) that can determine the right method to use. Alternatively or additionally, some aspects use a decision-theoretic model that models the costs (e.g., user time/annoyance) of providing different types of feedback to select how to provide feedback. Some aspects share prediction models across a wide collection of users in different domains. This data can help the system learn if it is correct about when it thinks there is ambiguity, and if the user appreciates or declines to provide feedback, and which types of methods to ask for clarification are preferred by users in different types of situations.

Figure 16:
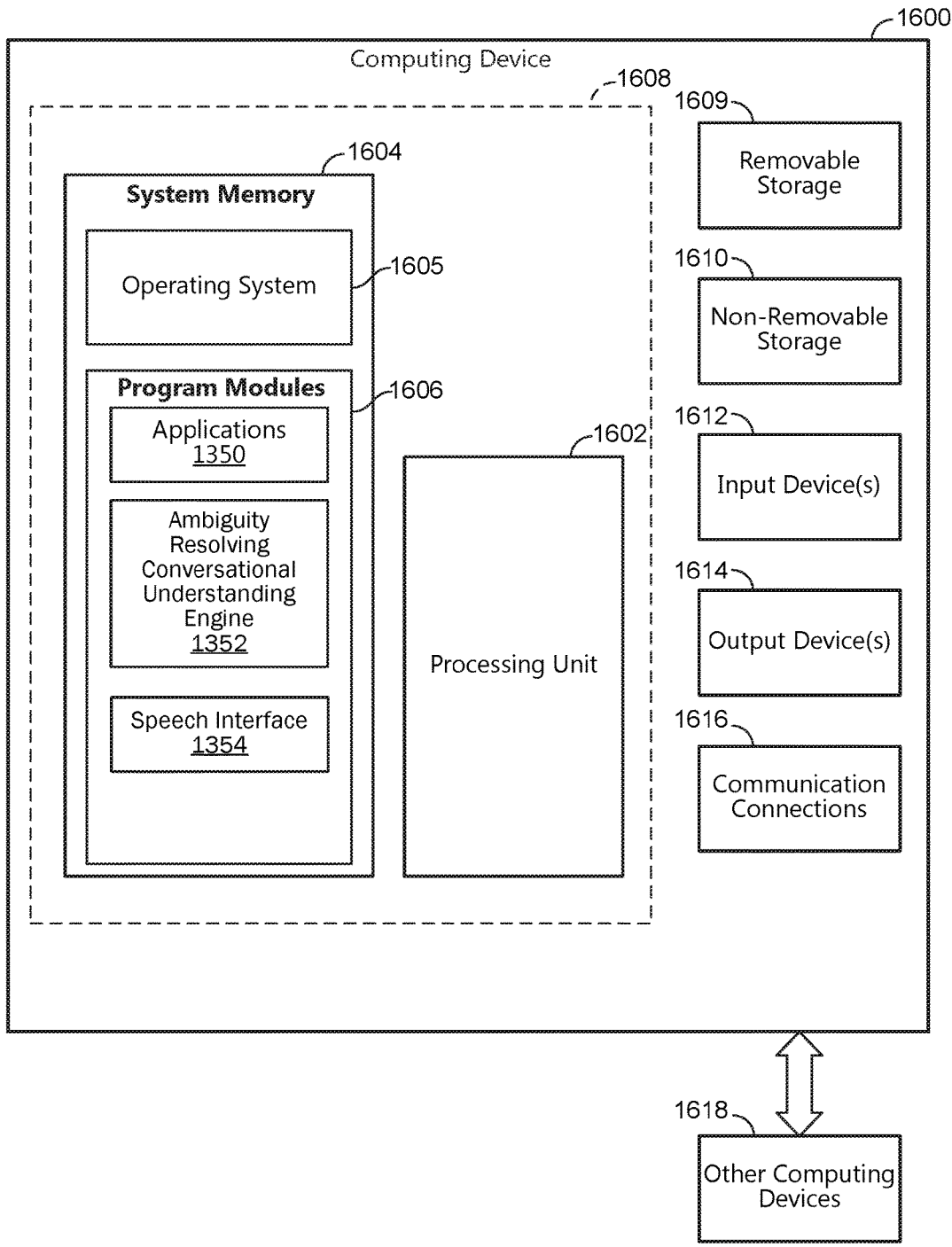
FIG. 16 is a block diagram illustrating example physical components of a computing device.
Figure 17A:
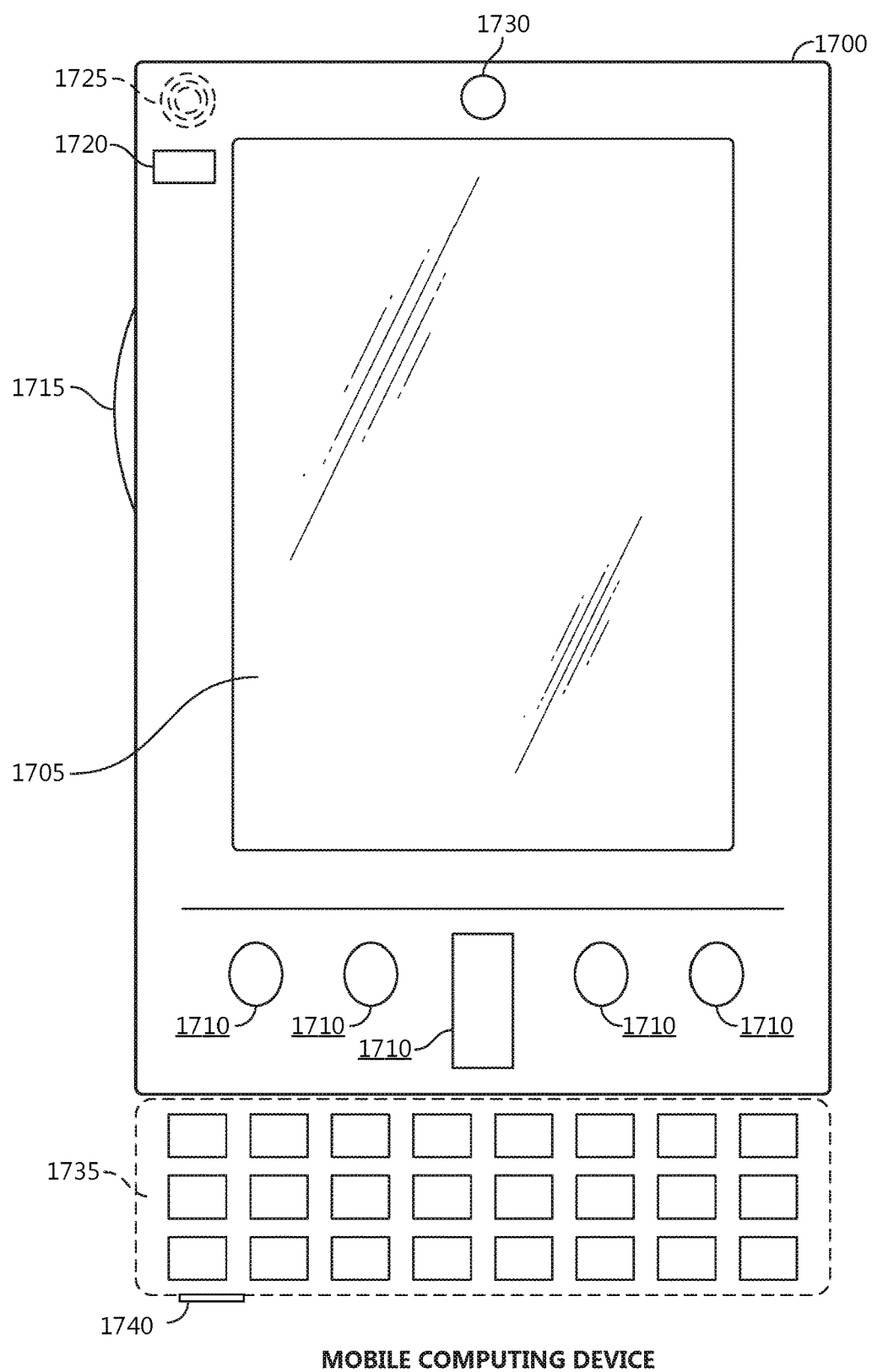
FIGS. 17A and 17B are block diagrams of a mobile computing device.
Figure 17B:
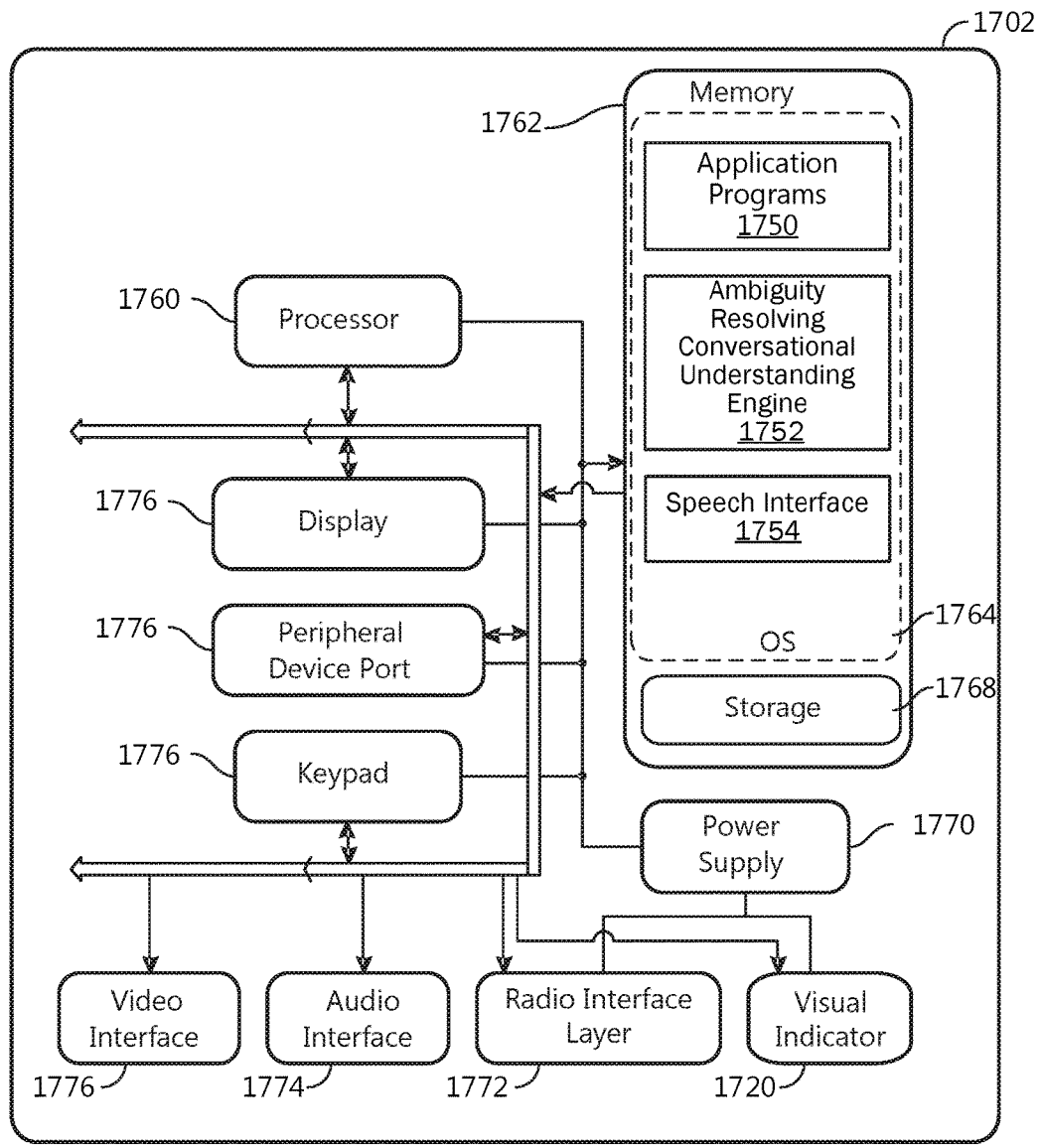
Figure 18:
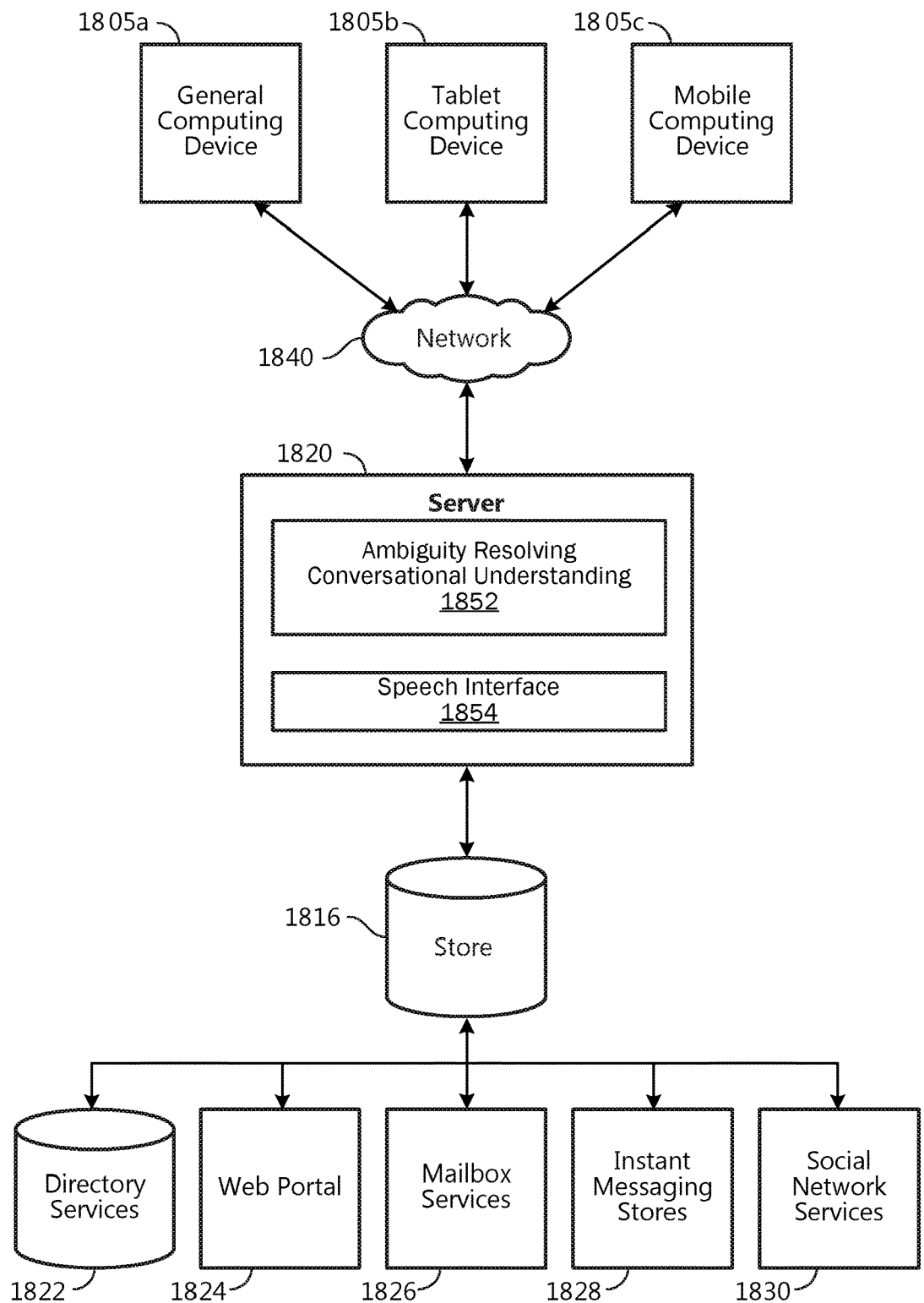
FIG. 18 is a block diagram of a distributed computing system.

FIGS. 16-18 and the associated descriptions provide a discussion of a variety of operating environments in which examples are practiced. However, the devices and systems illustrated and discussed with respect to FIGS. 16-18 are for purposes of example and illustration and are not limiting of a vast number of computing device configurations that are utilized for practicing aspects, described herein.

FIG. 16 is a block diagram illustrating physical components (i.e., hardware) of a computing device 1600 with which examples of the present disclosure may be practiced.

In a basic configuration, the computing device 1600 includes at least one processing unit 1602 and a system memory 1604. According to an aspect, depending on the configuration and type of computing device, the system memory 1604 comprises, but is not limited to, volatile storage (e.g., random access memory), non-volatile storage (e.g., read-only memory), flash memory, or any combination of such memories. According to an aspect, the system memory 1604 includes an operating system 1605 and one or more program modules 1606 suitable for running software applications 1650. According to an aspect, the system memory 1604 includes an ambiguity resolving conversational understanding engine 1352 and a speech interface 1354. The operating system 1605, for example, is suitable for controlling the operation of the computing device 1600. Furthermore, aspects are practiced in conjunction with a graphics library, other operating systems, or any other application program, and are not limited to any particular application or system. This basic configuration is illustrated in FIG. 16 by those components within a dashed line 1608. According to an aspect, the computing device 1600 has additional features or functionality. For example, according to an aspect, the computing device 1600 includes additional data storage devices (removable and/or non-removable) such as, for example, magnetic disks, optical disks, or tape. Such additional storage is illustrated in FIG. 16 by a removable storage device 1609 and a non-removable storage device 1610.

As stated above, according to an aspect, a number of program modules and data files are stored in the system memory 1604. While executing on the processing unit 1602, the program modules 1606 (e.g., applications 1350, ambiguity resolving conversational understanding engine 1352, and speech interface 1354) perform processes including, but not limited to, one or more of the stages of the methods 500 and 600 illustrated in FIGS. 5 and 6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 16 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1600 has one or more input device(s) 1612 such as a keyboard, a mouse, a pen, a sound input device, a touch input device, etc. The output device(s) 1614 such as a display, speakers, a printer, etc. are also included according to an aspect. The aforementioned devices are examples and others may be used. According to an aspect, the computing device 1600 includes one or more communication connections 1616 allowing communications with other computing devices 1618. Examples of suitable communication connections 1616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1604, the removable storage device 1609, and the non-removable storage device 1610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1600. According to an aspect, any such computer storage media is part of the computing device 1600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 17A and 17B illustrate a mobile computing device 1700, for example, a mobile telephone, a smart phone, a tablet personal computer, a laptop computer, and the like, with which aspects may be practiced. With reference to FIG. 17A, an example of a mobile computing device 1700 for implementing the aspects is illustrated. In a basic configuration, the mobile computing device 1700 is a handheld computer having both input elements and output elements. The mobile computing device 1700 typically includes a display 1705 and one or more input buttons 1710 that allow the user to enter information into the mobile computing device 1700. According to an aspect, the display 1705 of the mobile computing device 1700 functions as an input device (e.g., a touch screen display). If included, an optional side input element 1715 allows further user input. According to an aspect, the side input element 1715 is a rotary switch, a button, or any other type of manual input element. In alternative examples, mobile computing device 1700 incorporates more or fewer input elements. For example, the display 1705 may not be a touch screen in some examples. In alternative examples, the mobile computing device 1700 is a portable phone system, such as a cellular phone. According to an aspect, the mobile computing device 1700 includes an optional keypad 1735. According to an aspect, the optional keypad 1735 is a physical keypad. According to another aspect, the optional keypad 1735 is a "soft" keypad generated on the touch screen display. In various aspects, the output elements include the display 1705 for showing a graphical user interface (GUI), a visual indicator 1720 (e.g., a light emitting diode), and/or an audio transducer 1725 (e.g., a speaker). In some examples, the mobile computing device 1700 incorporates a vibration transducer for providing the user with tactile feedback. In yet another example, the mobile computing device 1700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1700 incorporates peripheral device port 1740, such as an audio input (e.g., a microphone jack), an audio output (e.g., a headphone jack), and a video output (e.g., a HDMI port) for sending signals to or receiving signals from an external device.

FIG. 17B is a block diagram illustrating the architecture of one example of a mobile computing device. That is, the mobile computing device 1700 incorporates a system (i.e., an architecture) 1702 to implement some examples. In one example, the system 1702 is implemented as a "smart phone" capable of running one or more applications (e.g., browser, e-mail, calendaring, contact managers, messaging clients, games, and media clients/players). In some examples, the system 1702 is integrated as a computing device, such as an integrated personal digital assistant (PDA) and wireless phone.

According to an aspect, one or more application programs 1750 are loaded into the memory 1762 and run on or in association with the operating system 1764. Examples of the application programs include phone dialer programs, e-mail programs, personal information management (PIM) programs, word processing programs, spreadsheet programs, Internet browser programs, messaging programs, and so forth. According to an aspect, an ambiguity resolving conversational understanding engine 1752 and a speech interface 1754 are loaded into memory 1762. The system 1702 also includes a non-volatile storage area 1768 within the memory 1762. The non-volatile storage area 1768 is used to store persistent information that should not be lost if the system 1702 is powered down. The application programs 1750 may use and store information in the non-volatile storage area 1768, such as e-mail or other messages used by an e-mail application, and the like. A synchronization application (not shown) also resides on the system 1702 and is programmed to interact with a corresponding synchronization application resident on a host computer to keep the information stored in the non-volatile storage area 1768 synchronized with corresponding information stored at the host computer. As should be appreciated, other applications may be loaded into the memory 1762 and run on the mobile computing device 1700.

According to an aspect, the system 1702 has a power supply 1770, which is implemented as one or more batteries. According to an aspect, the power supply 1770 further includes an external power source, such as an AC adapter or a powered docking cradle that supplements or recharges the batteries.

According to an aspect, the system 1702 includes a radio 1772 that performs the function of transmitting and receiving radio frequency communications. The radio 1772 facilitates wireless connectivity between the system 1702 and the "outside world," via a communications carrier or service provider. Transmissions to and from the radio 1772 are conducted under control of the operating system 1764. In other words, communications received by the radio 1772 may be disseminated to the application programs 1750 via the operating system 1764, and vice versa.

According to an aspect, the visual indicator 1720 is used to provide visual notifications and/or an audio interface 1774 is used for producing audible notifications via the audio transducer 1725. In the illustrated example, the visual indicator 1720 is a light emitting diode (LED) and the audio transducer 1725 is a speaker. These devices may be directly coupled to the power supply 1770 so that when activated, they remain on for a duration dictated by the notification mechanism even though the processor 1760 and other components might shut down for conserving battery power. The LED may be programmed to remain on indefinitely until the user takes action to indicate the powered-on status of the device. The audio interface 1774 is used to provide audible signals to and receive audible signals from the user. For example, in addition to being coupled to the audio transducer 1725, the audio interface 1774 may also be coupled to a microphone to receive audible input, such as to facilitate a telephone conversation. According to an aspect, the system 1702 further includes a video interface 1776 that enables an operation of an on-board camera 1730 to record still images, video stream, and the like.

According to an aspect, a mobile computing device 1700 implementing the system 1702 has additional features or functionality. For example, the mobile computing device 1700 includes additional data storage devices (removable and/or non-removable) such as, magnetic disks, optical disks, or tape. Such additional storage is illustrated in FIG. 17B by the non-volatile storage area 1768.

According to an aspect, data/information generated or captured by the mobile computing device 1700 and stored via the system 1702 are stored locally on the mobile computing device 1700, as described above. According to another aspect, the data are stored on any number of storage media that are accessible by the device via the radio 1772 or via a wired connection between the mobile computing device 1700 and a separate computing device associated with the mobile computing device 1700, for example, a server computer in a distributed computing network, such as the Internet. As should be appreciated such data/information are accessible via the mobile computing device 1700 via the radio 1772 or via a distributed computing network. Similarly, according to an aspect, such data/information are readily transferred between computing devices for storage and use according to well-known data/information transfer and storage means, including electronic mail and collaborative data/information sharing systems.

FIG. 18 illustrates one example of the architecture of a system for resolving ambiguity in a conversation understanding system as described above. Content developed, interacted with, or edited in association with the ambiguity resolving conversational understanding 1852 and speech interface 1854 is enabled to be stored in different communication channels or other storage types. For example, various documents may be stored using a directory service 1822, a web portal 1824, a mailbox service 1826, an instant messaging store 1828, or a social networking site 1830. The ambiguity resolving conversational understanding 1852 is operative to use any of these types of systems or the like for resolving ambiguity in conversational understanding, as described herein. According to an aspect, a server 1820 provides the ambiguity resolving conversational understanding 1852 and speech interface 1854 to clients 1805a,b,c. As one example, the server 1820 is a web server providing the ambiguity resolving conversational understanding 1852 and speech interface 1854 over the web. The server 1820 provides the ambiguity resolving conversational understanding 1852 and speech interface 1854 over the web to clients 1805 through a network 1840. By way of example, the client computing device is implemented and embodied in a personal computer 1805*a*, a tablet computing device 1805*b* or a mobile computing device 1805*c* (e.g., a smart phone), or other computing device. Any of these examples of the client computing device are operable to obtain content from the store 1816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A network-based ambiguity resolving conversational understanding system, the system comprising:
    at least one processor; and
    memory, operatively connected to the at least one processor and storing instructions that, when executed by the at least one processor, cause the at least one processor to:
        receive, via a network, a natural language input from a user computing device;
        identify an agent action based, at least in part, on the natural language input;
        determine an ambiguity in the agent action;
        determine an ambiguity value associated with the ambiguity in the agent action;
        evaluate the ambiguity value against a criticality level associated with the agent action, the criticality level corresponding to a consequential severity of performing an incorrect agent action, wherein the criticality level decreases when the agent action is reversible;
        when it is determined that the ambiguity value meets the criticality level:
            select a prompting action based, at least in part, on the ambiguity in the agent action, wherein the prompting action comprises one or more of an audio feedback output by an audio component of the user computing device and a visual feedback provided on a display of the user computing device;
            initiate performance of the prompting action by the user computing device;
            receive additional input in response to the prompting action; and
            update the agent action to resolve the ambiguity based, at least in part, on the additional input; and
        initiate performance of the agent action.

2. The system of claim 1, wherein the ambiguity value is based, at least in part, on at least two sources of ambiguity.

3. The system of claim 1, wherein the natural language input is a speech input.

4. The system of claim 3, further comprising instructions for determining an ambiguity value associated with an automatic speech recognition of the speech input.

5. The system of claim 1, further comprising instructions for:
    performing language understanding based, at least in part, on the natural language input to attribute a meaning to the natural language input;
    retrieving information from a data source based, at least in part, on the meaning attributed to the natural language input; and
    determining the agent action based, at least in part, on the meaning attributed to the natural language input and the retrieved information.

6. The system of claim 5, further comprising instructions for:
    accessing task state information associated with a current task; and
    determining the agent action based, at least in part, on the task state information.

7. The system of claim 1, further comprising instructions for transmitting results of the performance of the agent action to the user computing device.

8. The system of claim 1, further comprising instructions for transmitting the agent action to the user computing device for performance by the user computing device.

9. The system of claim 1, further comprising instructions for transmitting the prompting action to the user computing device.

10. A method for resolving an ambiguity in a conversational understanding system, comprising:
    receiving, at a computing device, a speech input from a user;
    performing automatic speech recognition on the speech input;
    identifying an agent action based, at least in part, on the speech input;
    determining whether there is an ambiguity in the agent action;
    when it is determined that there is an ambiguity in the agent action, determining a criticality level of the agent action, the criticality level being based, at least in part, on a severity of one or more unintended consequences of taking an agent action that was not intended by the user, wherein the criticality level decreases when the agent action is reversible;
    when it is determined that the criticality level is above a threshold:
        providing a prompting action based, at least in part, on the ambiguity in the agent action, the prompting action being one or more of an audio prompt output by an audio component of the computing device and a visual prompt output on a display of the computing device;

receiving additional input in response to the prompting action; and updating the agent action to resolve the ambiguity based, at least in part, on the additional input; and performing the agent action.

11. The method of claim 10, wherein determining whether there is an ambiguity in the agent action comprise determining ambiguity values based on at least two sources of ambiguity.

12. The method of claim 11, wherein determining whether there is an ambiguity in the agent action comprises determining an ambiguity value associated with performing automatic speech recognition on the speech input.

13. The method of claim 10, wherein identifying the agent action comprises:

performing language understanding based, at least in part, on the speech input to attribute a meaning to the speech input;

retrieving information from a data source based, at least in part, on the meaning attributed to the speech input; and determining the agent action based, at least in part, on the meaning attributed to the speech input and the retrieved information.

14. The method of claim 13, wherein identifying the agent action based, at least in part, on the natural language input further comprises accessing task state information associated with a current task and determining the agent action based, at least in part, on the task state information.

15. The method of claim 10, wherein receiving the natural language input comprises receiving a textual input.

16. A computing device, comprising:

at least one processor; and a memory coupled to the at least one processor and storing instructions that, when executed by the at least one processor, perform a method, comprising:

receiving, by the computing device, an initial natural language input;

identifying an agent action based, at least in part, on the initial natural language input;

determining whether there is an ambiguity in the agent action;

when it is determined that there is an ambiguity in the agent action, determining a criticality level of the agent action, the criticality being based, at least in part, on a consequence of performing an unintended agent action, wherein the criticality level decreases when the agent action is reversible;

when it is determined that the criticality level is above a threshold:

providing a prompting action based, at least in part, on the ambiguity in the agent action, the prompting action being one or more of an audio prompt output by an audio component of the computing device and a visual prompt output on a display of the computing device;

receiving additional input; and using the additional input to update the agent action to resolve the ambiguity; and performing the agent action.

17. The computing device of claim 16, wherein determining whether there is an ambiguity in the agent action comprises determining ambiguity values based on at least two sources of ambiguity.

18. The computing device of claim 16, wherein receiving a natural language input comprises receiving a speech input.

19. The computing device of claim 16, wherein identifying the agent action comprises:

performing language understanding based, at least in part, on the natural language input to attribute a meaning to the natural language input;

retrieving information from a data source based, at least in part, on the meaning attributed to the natural language input; and determining the agent action based, at least in part, on the meaning attributed to the natural language input and the retrieved information.

20. The system of claim 1, wherein the visual feedback is used to clarify the audio feedback when both the visual feedback and audio feedback are output by the user computing device.

* * * * *